(12) United States Patent
Preston et al.

(10) Patent No.: US 10,855,362 B2
(45) Date of Patent: Dec. 1, 2020

(54) COMBINER FOR USE IN A SATELLITE COMMUNICATION SYSTEM

(71) Applicant: Kymeta Corporation, Redmond, WA (US)

(72) Inventors: Shawn Preston, Redmond, WA (US); Nathan Bialke, Redmond, WA (US); Maxwell Smoot, Seattle, WA (US); Michael Kreeger, Redmond, WA (US); Michael Schwager, Redmond, WA (US); John Braswell, Redmond, WA (US); John Nebel, Redmond, WA (US); Andreas Wanka, Redmond, WA (US); Ron Radko, Kirkland, WA (US); Steven C. Borchers, Redmond, WA (US); Raj Swaminathan, Redmond, WA (US); Steven Michael Ziuchkovski, Redmond, WA (US); Eric Bjorn Hultman, Redmond, WA (US); Lekshmi Priya Ravindran Subhadramma, Redmond, WA (US); Daeup Chang, Redmond, WA (US); Serge Makhoul, Redmond, WA (US); Kevin KleinOsowski, Redmond, WA (US); Alex Schnedler, Redmond, WA (US); Joseph Taylor, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 16/723,586

(22) Filed: Dec. 20, 2019

(65) Prior Publication Data

US 2020/0212992 A1 Jul. 2, 2020

Related U.S. Application Data

(60) Provisional application No. 62/786,135, filed on Dec. 28, 2018, provisional application No. 62/786,292, (Continued)

(51) Int. Cl.
*H04B 7/02* (2018.01)
*H04L 1/02* (2006.01)
(Continued)

(52) U.S. Cl.
CPC .............. *H04B 7/0885* (2013.01); *H04B 1/40* (2013.01); *H04B 7/18513* (2013.01)

(58) Field of Classification Search
CPC .... H04B 7/0885; H04B 1/40; H04B 7/18513; H04B 7/0615; H04B 7/18517;
(Continued)

(56) References Cited

U.S. PATENT DOCUMENTS 7,133,698 B2 * 11/2006 Miyoshi ............... H04B 7/0615
455/562.1
10,128,931 B2 * 11/2018 Rothaar ............... H04B 7/0604
(Continued)

FOREIGN PATENT DOCUMENTS

WO 2018-017877 1/2018

OTHER PUBLICATIONS

International Search Report for Application No. PCT/US2019/068636 dated Apr. 27, 2020, 6 pages.

*Primary Examiner* — Phuong Phu
(74) *Attorney, Agent, or Firm* — Womble Bond Dickinson (US) LLP

(57) ABSTRACT

A combining apparatus for use in a satellite communication system and a method for using the same. In one embodiment, the apparatus comprises: a plurality of antennas that each have a transmit aperture and a receive aperture and are operable to receive correlated signals from a satellite, wherein the receive aperture is operable to receive one of the signals from the satellite and determine its signal quality; a combiner communicably coupled to the plurality of antennas to combine multiple signals received from the plurality of
(Continued)

antennas into one signal, wherein the combiner is operable to determine which signals received by the plurality of antennas are to be combined into the one signal based, at least in part, on at least one signal quality metric regarding the signals, the at least one signal quality metric being received from one or more tracking receivers external to the combiner; and a modem communicably coupled to receive the one signal from the combiner, wherein the modem is operable to send information to the plurality of antennas via the combiner as if only a single antenna is coupled to the combiner and the combiner is operable to aggregate information for the modem received from antennas in the plurality of antennas as if one single antenna provided the information to the combiner.

23 Claims, 16 Drawing Sheets

Related U.S. Application Data filed on Dec. 28, 2018, provisional application No. 62/786,281, filed on Dec. 28, 2018, provisional application No. 62/786,257, filed on Dec. 28, 2018.

(51) Int. Cl.
   *H04B 7/08* (2006.01)
   *H04B 1/40* (2015.01)
   *H04B 7/185* (2006.01)

(58) Field of Classification Search
   CPC .. H04B 7/0695; H04B 7/0604; H01Q 21/205; H01Q 21/28
   USPC .......................................... 375/267, 299, 347
   See application file for complete search history.

(56) References Cited

U.S. PATENT DOCUMENTS

| | | |
|---|---|---|
| 2006/0111056 A1* | 5/2006 | Dutta ................... H01Q 21/205 |
| | | 455/103 |
| 2008/0001820 A1 | 1/2008 | Dybdal et al. |
| 2008/0111741 A1 | 5/2008 | Lee et al. |
| 2016/0233588 A1* | 8/2016 | Bily ....................... H01Q 21/28 |
| 2017/0104538 A1 | 4/2017 | Stapleton et al. |
| 2018/0098247 A1 | 4/2018 | Gopal et al. |
| 2019/0020405 A1* | 1/2019 | Smith ................ H04B 7/18517 |
| 2019/0068265 A1* | 2/2019 | Lee ...................... H04B 7/0695 |

* cited by examiner

COMBINER FOR USE IN A SATELLITE COMMUNICATION SYSTEM

PRIORITY

The present patent application claims priority to and incorporates by reference the corresponding U.S. Provisional Patent Application Nos. 62/786,135, titled, "A COMBINER HAS COMMUNICATION WITH A FLAT PANEL ANTENNA TO OBTAIN RF METRICS USED FOR RF SIGNAL COMBINING," filed on Dec. 28, 2018; 62/786,292, titled "DYNAMIC COMBINING RECOVERY WITH SIGNAL RE-ACQUISITION TO PROVIDE FAULT TOLERATNT SIGNAL COMBINING," filed on Dec. 28, 2018; 62/786,281, titled "COMBINED ANTENNAS CONTROLLED AS SINGLE ANTENNA," filed on Dec. 28, 2018; and 62/786,257, titled "COMBINER ACTS AS ROUTER FOR AN ANTENNA (BOTH RF AND NETWORK CONTROL), filed on Dec. 28, 2018.

FIELD OF THE INVENTION

Embodiments of the present invention relate to the field of satellite communication; more particularly, embodiments of the present invention relate to radio frequency (RF) signal combining.

BACKGROUND OF THE INVENTION

When using electrically-steerable flat-panel antennas for satellite communications, there is often a need to provide communications links with performance that cannot be achieved with a single aperture. This may often be the case when there is a weak signal from the satellite. When this occurs, an antenna trying to receive the signal from the satellite may not have a signal-to-noise ratio (SNR) that is sufficient for use. A ground terminal's ability to receive high bit rates depends on that terminal's ability to have a high gain-to-noise temperature (G/T) antenna.

Radio frequency (RF) combining is known in the art. For example, in the area of cellular, RF combining has been used in Multiple Input, Multiple Output (MIMO) deployments. Similarly, RF combining has been used in satellite combiners.

SUMMARY OF THE INVENTION

A combining apparatus for use in a satellite communication system and a method for using the same. In one embodiment, the apparatus comprises: a plurality of antennas that each have a transmit aperture and a receive aperture and are operable to receive correlated signals from a satellite, wherein the receive aperture is operable to receive one of the signals from the satellite and determine its signal quality; a combiner communicably coupled to the plurality of antennas to combine multiple signals received from the plurality of antennas into one signal, wherein the combiner is operable to determine which signals received by the plurality of antennas are to be combined into the one signal based, at least in part, on at least one signal quality metric regarding the signals, the at least one signal quality metric being received from one or more tracking receivers external to the combiner; and a modem communicably coupled to receive the one signal from the combiner, wherein the modem is operable to send information to the plurality of antennas via the combiner as if only a single antenna is coupled to the combiner and the combiner is operable to aggregate information for the modem received from antennas in the plurality of antennas as if one single antenna provided the information to the combiner, thereby enabling the combiner to present the plurality of antennas as the single antenna and the modem to communicate via the combiner as if controlling one single antenna.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
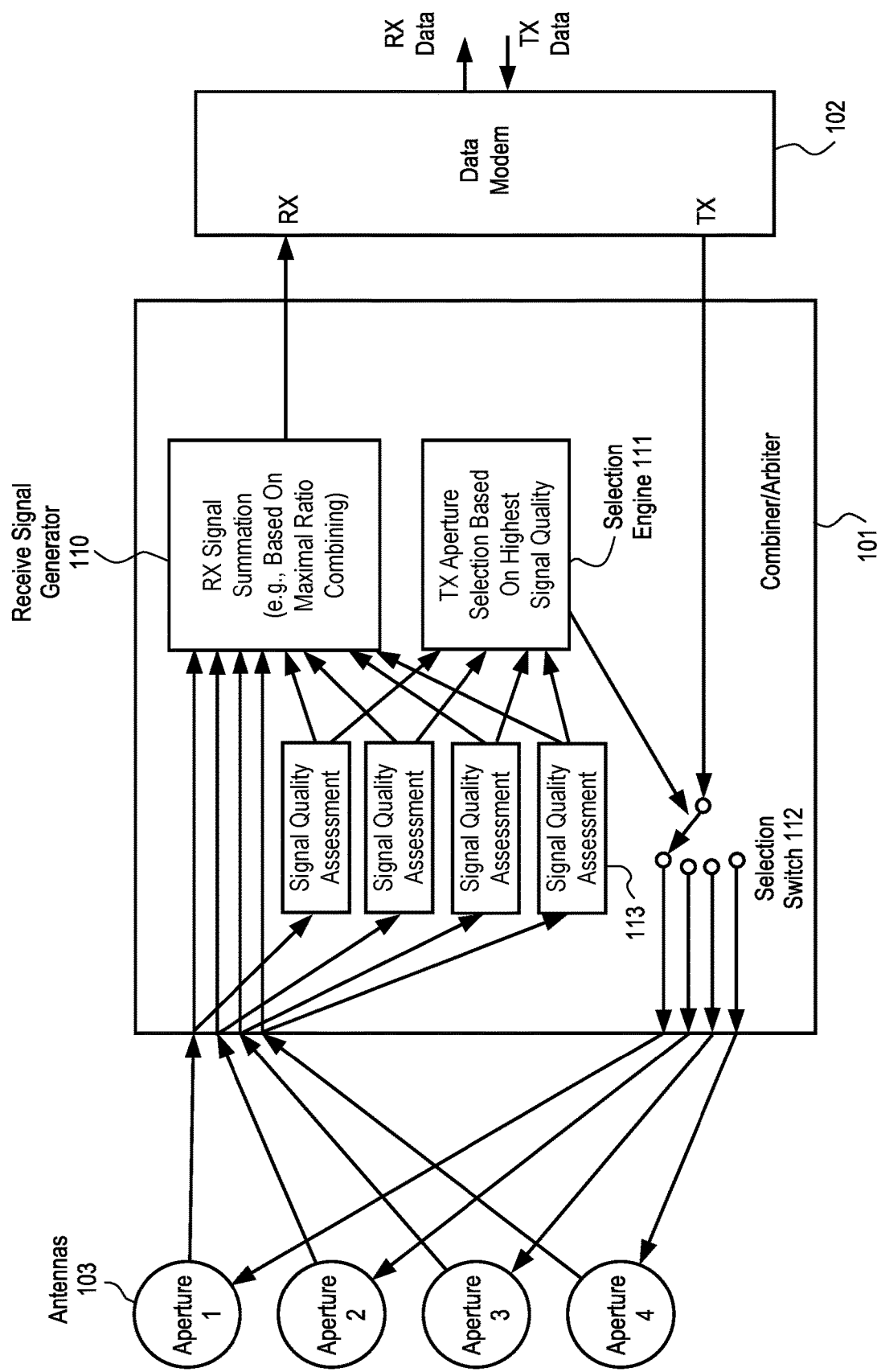
FIG. 1A is a block diagram of one embodiment of a combiner/arbiter in a satellite system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The techniques above may be included in a system and method for combining the signals from several satellite antennas to achieve higher receive (Rx) link performance than is possible when using only one antenna. Embodiments of the antenna also include techniques to analyze the Rx signal quality from each of the antennas and dynamically select a best antenna for transmitting to that same satellite. This is referred to herein as Rx combining w/transmit (Tx) arbitration.

When using electronically-steerable flat-panel antennas for satellite communications with the techniques described herein, the received (Rx) signal combining provides communications links with performance that cannot be achieved with using a single antenna aperture. A ground terminal's ability to receive high bit rates depends on that terminal's ability to have a high gain-to-noise-temperature (G/T) antenna. A higher G/T antenna can be, in essence, created by electronically combining the signals from 2 (or more) lower G/T antennas by using a combiner. In one embodiment, a high G/T is achieved by summing the Rx signals from all the antennas coherently. In one embodiment, to combine Rx signals coherently, the combiner time aligns the signals and then removes any residual phase differences in a manner well-known in the art. Once the receive signals are coherent, they are added or summed together. In one embodiment, the receive signals are added in a ratio that depends on the quality of the receive signal from each antenna. In one embodiment, the combining is performed using Maximal Ratio Combining (MRC), which is well-known in the art, or an approximation thereof. In this manner, the combining occurs in the digital domain, not the RF domain.

In one embodiment, if the combining operation is accomplished to a reasonable degree of accuracy, then the summation produces a 2-3 dB increase in G/T for each doubling of total antenna area. When the antennas are mounted on a vessel (e.g., ship, automobile, etc.), the motion continually changes the distance and orientation of each of the antennas relative to the satellite. Hence, in such an embodiment, the time alignment function, the phase correction function, and Rx signal quality assessment are very responsive to the constantly changing signals. This is possible because the signal measurements can be made within the combiner itself and the corrections can be made to the signals immediately.

In one embodiment, only one antenna aperture is used at a time for transmission. The signals transmitted from a ground terminal cannot be received for hundreds of milliseconds due to the signal path distance from the terminal to the hub that goes through the satellite. A modem at the hub could measure the combined received signal from simultaneous transmitting apertures but wouldn't be able to provide timely instruction back to the terminal on how to change the transmit time-alignment of each aperture so that the combined signal at the hub modem is coherent.

In one embodiment, the transmit (Tx) aperture used for transmission at any given moment is the one antenna that is receiving the RF signal with the best RF signal quality (e.g., best EsN0 etc.). In one embodiment, the Rx signal with the best signal quickly is known because of continually monitoring Rx signal quality of all the antenna apertures. In one embodiment, this occurs as part of the receive signal combining process described herein (e.g., as part of the Maximal Ratio Combining function).

Embodiments of the invention include a combiner system that operates multiple antennas, each of which has a transmit aperture and a receive aperture that produce beam patterns that are directed towards a common satellite, where the combiner performs signal combining functions to enhance the overall effective G/T of the received signal (as the processing gain is being increased and the Rx noise floor as seen by the modem is being suppressed) and uses the knowledge of the quality of each of the Rx signals to select a preferred single aperture for transmission.

FIG. 1A is a block diagram of one embodiment of a combiner/arbiter in a satellite system. Referring to FIG. 1A, combiner/arbiter 101 is coupled to a plurality of antennas 103 and a data modem 102. Although four antennas are shown in FIG. 1A, there may be more or less than four antennas in the satellite system. Each of the antennas 103 (aperture 1-4) receives a signal from the satellite and the received signals are sent to combiner/arbiter 101. In one embodiment, the signals received by each antenna from the satellite are correlated (with noise being uncorrelated) such that symbols received by the antennas are the same. Note that it's possible that one or more antennas are not in the field of view of the satellite, or are otherwise not being used to receive a signal, and thus do not produce a received signal from the satellite at certain periods of time.

In one embodiment, the antennas are electronically-steerable flat panel antennas, and each of the electronically-steerable flat-panel antennas includes at least two spatially interleaved antenna arrays combined in a single physical aperture operable independently and simultaneously at distinct frequencies, where those two antenna sub-arrays comprise a tunable slotted array of antenna elements. In one embodiment, at least one of the transmit aperture and the receive aperture operates based on holographic beam forming. Such antennas are described in greater detail below. An example of such an antenna is described in U.S. Patent Publication No. 2016-0233588A1, entitled "Combined Antenna Apertures Allowing Simultaneous Multiple Antenna Functionality," filed Nov. 30, 2015. Note that while four antennas are shown in FIG. 1A, the techniques described herein are not limited to use with four antennas, and may be performed with more or less than (e.g., 2, 3, etc.) four antennas.

The received signals from antennas 103 are sent to receive signal generator 110, which combines the signals into a single received signal. In one embodiment, receive signal generator 110 combines the receive signals by summing the receive signals together. In one embodiment, the receive signals are summed using Maximal Ratio combining, which is well-known in the art, or an approximation thereof. The signals may be combined in other ways, such as, for example, but not limited to equal gain combining, switched combining, and selection combining. The single received signal generated by receive signal generator 110 from the signals received from antennas 103 is sent to data modem 102, which provides it to the rest of the communication system.

In one embodiment, the signals received from the antennas 103 are also analyzed by signal analyzers for signal quality. In one embodiment, signal analyzers are shown as signal quality assessment units 113 that are part of combiner/arbiter 101 in FIG. 1A. Signal analyzers generate signal quality information for each of the receive signals and store the signal quality information in a memory for use immediately or later as part of the combining process. The memory may be part of combiner/arbiter 101 or may be external to, but accessible by, combiner/arbiter 101. Alternatively, the signal quality information is not stored in memory and the signal quality information is used immediately upon reception. In one embodiment, the signal quality information comprises a signal-to-noise ratio (SNR) for each receive signal. In one embodiment, the SNR signal is received from each of antennas 103, which includes a controller with a tracking receiver to determine the SNR of its received signal and to forward it to combiner 101. In another embodiment, the signal analyzers are not part of combiner/arbiter 101 and are in another part of the satellite system. In such a case, signal quality assessment units 113 are simply storage areas in memory that store the signal quality information and send them to, or make them accessible by, selection engine 111. Selection engine 111 selects one of antennas 103 to transmit to the satellite. In one embodiment, selection engine 111 signals a selection switch 112 to cause the transmit (Tx) signal from data modem 102 to be sent to the selected antenna for transmission. In one embodiment, selection switch 112 is an RF switch. In one embodiment, selection engine 111 selects the one antenna for transmission based on the signal quality of the signals received from each of antennas 103. This signal quality determination is made by obtaining the signal quality information from signal quality assessment units 113. In one embodiment, selection engine 111 comprises hardware (e.g., circuitry, dedicated logic, etc.), software (such as is run on a general-purpose computer system or a dedicated machine), firmware, or a combination of the three.

Note that in one embodiment, selection engine 111 selects the one antenna for transmission based on information using the signal quality of the signals and/or other information received from each of antennas 103 or other sources. In one embodiment, this includes the antenna's self-reported ability to transmit, which is impacted by its configured limits on pointing accuracy, pointing thresholds (e.g. theta/scan, elevation), known blockages (e.g. known bad phi plus theta ranges), and/or EIRP limits related to uplink power control (UPC). In one embodiment, the selection is made based on the state of health information from the combiner or antennas, which could include BUC status, temperatures, network connection status, scheduled software update, etc.

Note that FIG. 1A does not show specific frequency bands, or up-conversion and down-conversion functions. The concepts are not impacted by the techniques described herein and are the same, independent of whether the functions described herein occur at RF, IF, or baseband. Performing these functions at baseband is very tolerant to timing issues which would drive significant complexity for realizing our implementation with RF combining.

Figure 1B:
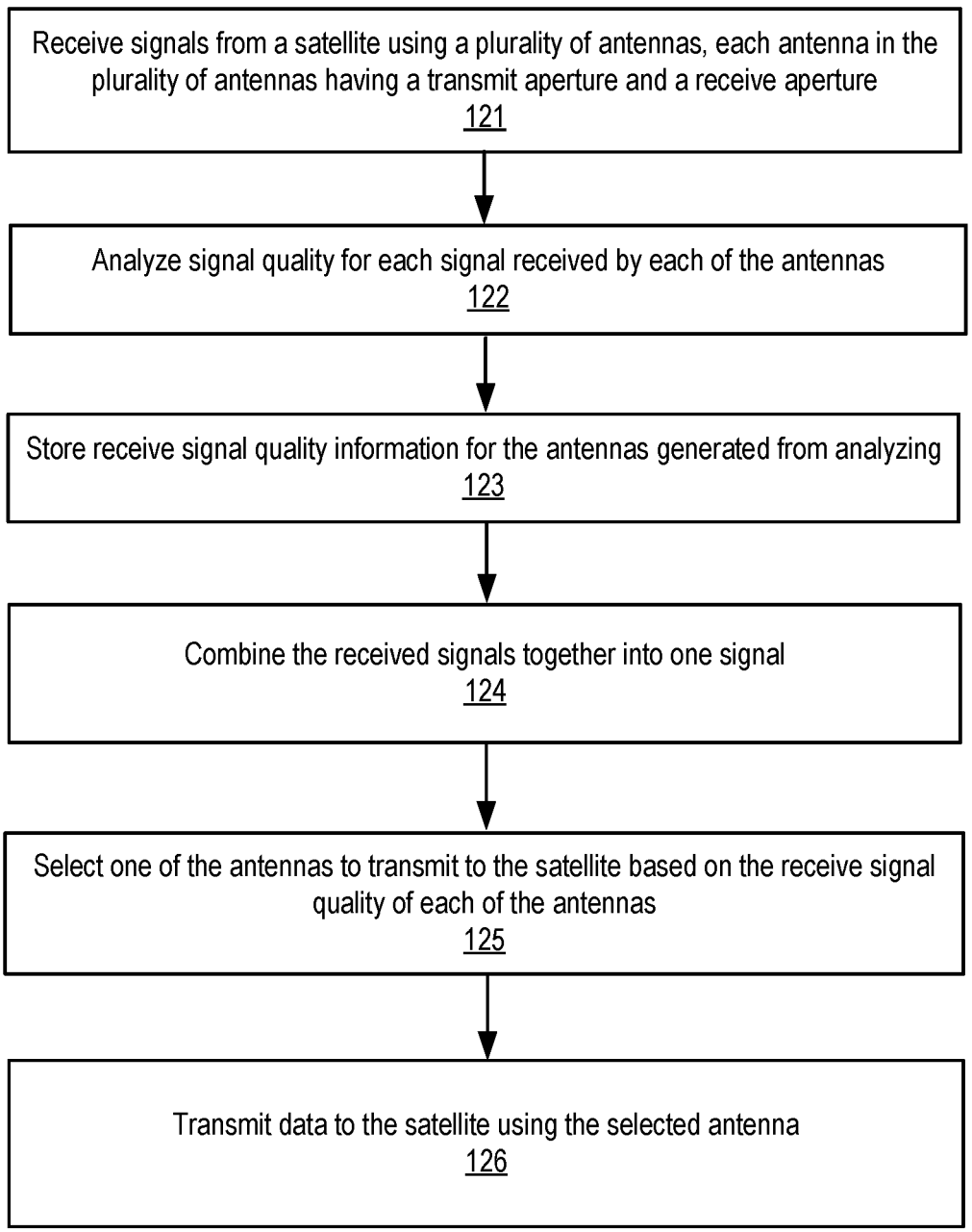
FIG. 1B is a flow diagram of one embodiment of a process for reception combining and transmission arbitration.

FIG. 1B is a flow diagram of one embodiment of a process for reception combining and transmission arbitration. In one embodiment, the processes are performed by processing logic that may comprise hardware (circuitry, dedicated logic, etc.), software (such as is run on a general-purpose computer system or a dedicated machine), firmware, or a combination of the three. In one embodiment, one or more operations in the flow diagram is performed by the combiner/arbiter of FIG. 1A.

Referring to FIG. 1B, the process begins with receiving signals from a satellite using a plurality of antennas, where each of the antennas has a transmit aperture and a receive aperture (processing block 121). In one embodiment, the signals received by each antenna from the satellite are correlated in that the bits of the signals received by the antennas are the same.

As discussed above, in one embodiment, the antennas are electronically-steerable flat panel antennas, and each of the electronically-steerable flat-panel antennas includes at least two spatially interleaved antenna arrays combined in a single physical aperture operable independently and simultaneously at distinct frequencies, where those two antenna sub-arrays comprise a tunable slotted array of antenna elements.

For each antenna, processing logic analyzes the signal quality for each received signal (processing block 122). In one embodiment, signal analyzers perform the analysis on each signal. In one embodiment, the signal analyzers measure an error vector between the ideal constellation point and the point received by the receiver, and may include, but are not limited to modulation error, error vector magnitude, energy per symbol to noise power spectral density ($E_s/N0$), energy per bit to noise power spectral density ratio ($E_b/N_o$), carrier-to-noise ratio, and signal-to-noise ratio, which are well-known in the art. These signal analyzers may be part of the combiner/arbiter or may be part of the satellite terminal and provide receive signal quality information as the results of their signal analysis to the combiner/arbiter. In one embodiment, the signal analysis is performed by a tracking receiver on the antenna that sends the Es/N0 (or another signal quality metric) of the received signal to the combiner/arbiter. In one embodiment, the signal analysis determines the Es/N0 of each of the received signals and that information is made available to the combiner/arbiter. Note that other signal quality metrics may be used instead of the Es/N0, including, but not limited to, receive signal strength and cross-correlation metric between channels. Note that in the description below, while Es/N0 is used for the signal quality metric, other signal quality metrics such as those described above and others that are well-known may be used or otherwise substituted in the processes described below.

After determining the receive signal quality information, processing logic stores the receive signal quality information for the antennas generated from analyzing (processing block 123). The receive signal quality information may be stored in a memory in the satellite terminal that is accessible by the combiner/arbiter. Alternatively, the receive signal quality information is stored in a memory in the combiner/arbiter.

Processing logic combines the received signals together into one signal (processing block 124). In one embodiment, combining the received signals comprises coherently summing the signals. In one embodiment, the received signals are combined using Maximal Ratio Combining (MRC), or an approximation thereof, in a manner well-known in the art. More specifically, in one embodiment, processing logic (e.g., processor hardware, software, firmware, or a combination of all three) in the combiner uses cross-correlation to combine the signals. Using one received signal as a reference, the combiner is able to cross-correlate the other signals to determine a delay estimate for each signal to add to the signal so that they can be combined with the reference signal. In one embodiment, the reference signal is the one received signal that is received from the antenna that is designated as the antenna for transmit out of all the antennas connected to the combiner. In another embodiment, the reference signal is the one received signal with the highest signal quality (e.g., the highest Es/N0).

In one embodiment, as part of MRC, processing logic in the combiner combines the signals in a weighted fashion. That is, a weight is determined for and applied to each of the received signals and the combined signal is a combination of the weighted amount of the received signals. In one embodiment, each of the weights is based on the Es/N0 (or signal quality) of its respective signal. In one embodiment, the weights are determined based on a proportion of the Es/N0 of its signal to the Es/N0 of the other signal or signals being combined. For example, if all the received signals to be combined have the same Es/N0, then they are combined using the same percentage of each of the signals. However, if two signals are being combined and the Es/N0 of one received signal is one-half the Es/N0 of another signal, then one-third of the received signal having one-half of the Es/N0 is combined with two-thirds of the received signal with the higher Es/N0. Thus, in one embodiment, the combining process performed by the combiner adds a weighted amount of the signal where the weights are based on the Es/N0 (or signal quality) of the signal.

Based on the receive signal quality of each of the antennas, processing logic selects one of the antennas to transmit to the satellite of each of the antennas (processing block 125). In one embodiment, the receive signal quality information is accessed from memory and used to select the antenna to transmit. In one embodiment, selecting the one antenna is based on the one antenna having a higher signal quality than other antennas in the plurality of antennas.

After selection, processing logic directs the transmit signal from the data modem to the selected antenna and the selected antenna transmits the data to the satellite (processing block 126).

Obtaining RF Metrics for RF Signal Combining

In one embodiment, each antenna calculates and stores its own metrics including RF signal quality (e.g., received signal Es/N0). In one embodiment, the combiner uses a communication protocol (e.g., TCP socket (with, e.g., text messages, binary messages, JSON messages) or other protocol) to communicate with connected antennas and on a continuous basis gathers actual antenna metrics (e.g., signal quality metrics, such as, for example, but not limited to, Es/N0 values). Having actual RF signal information from all antennas helps to combine signals in the most efficient way.

Figure 2:
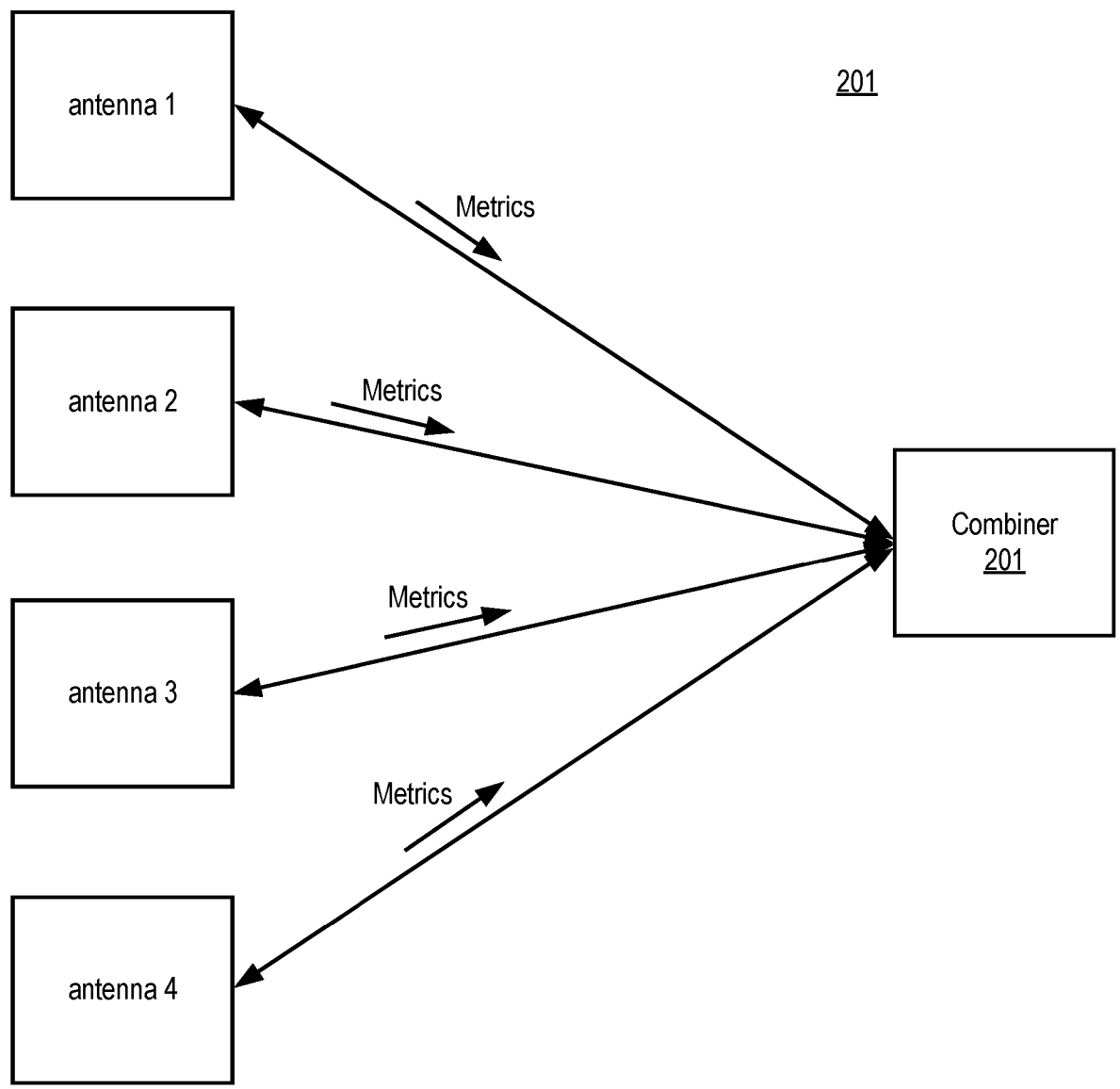
FIG. 2 illustrates a combiner collecting metrics from four antennas.

FIG. 2 illustrates a combiner, 201, collecting metrics from four antennas, antennas 1-4. In one embodiment, the metrics may be used to control the operations of the combiner including, for example, the combining of signals received by the antennas into one signal that is sent to a modem, performing arbitration to determine which antenna will be used for transmit at any one time, etc.

In one embodiment, a controller of the combiner (e.g., combiner 101 of FIG. 1A) receives up-to-date information about radio-frequency (RF) signal quality on all connected antennas without requiring costly RF measurement hardware or additional computation of signal quality information at the combiner. In one embodiment, the signal quality information is provided to the combiner from the antennas themselves. In one embodiment, each of the antennas has a tracking receiver to provide the signal quality information. Note that having the antenna provide the signal quality information allows some costly components for tuning and demodulation to be omitted from the combiner because it doesn't need to determine these metrics itself. For example, in one embodiment, each antenna includes a demodulator for use in generating antenna RF metrics (e.g., signal quality) so that the controller for the combiner doesn't need such a demodulator and doesn't have to generate the RF signal quality metrics on its own. That is, computation of RF metrics for RF signal quality can be generated at the antenna itself, freeing that computation time on the combiner for other operations. In this manner, high frequency receiver information is tracked on antennas themselves instead of the combiner. This reduces cost of combiner because there is no need to duplicate hardware. Another benefit of this is that the combiner is decoupled from the actual waveform, because the tracking receivers are specific to the waveform, thereby allowing the combiner to work with any antenna/waveform that can provide metrics or for which metrics can be provided.

In another embodiment, the signal quality information is provided by tracking receivers that are not part of the antenna but are external to the combiner. This also has these same benefits.

In one embodiment, maintaining up-to-date information about the RF signal quality is accomplished using continuous communication between combiner 201 and connected antennas 1-4 that monitor their metrics (e.g., RF signal quality metrics (e.g., Es/N0, SNR, RSSI, etc.) in real-time. In one embodiment, communication is continuous in that the metrics are obtained from each antenna at predetermined intervals. In one embodiment, the predetermined intervals are based on the frame rate of the antenna. In one embodiment, the frame rate is based on the speed at which the pattern is refreshed in the antenna (e.g., every 4 ms). In another embodiment, each antenna provides updated metrics on the regular interval (e.g., 4 ms) only if there has been a change in metric value from the previously provided value. This is particularly advantageous in situations where the antenna is not moving and the metrics aren't changing, thereby meaning that updates to the metrics won't need to occur as often. This is also advantageous for low symbol rate scenarios or when the device providing the metrics is only capable of a lower rate update.

In one embodiment, these RF metrics are collected by the antennas and are for antenna control and performance optimization. In one embodiment, the RF signal quality of the signals received by the antennas that is communicated to the combiner is used in decision making by the combiner controller.

In one embodiment, RF metrics are communicated between the antenna and the combiner in discrete messages of data over a network connection. In one embodiment, a well-known protocol (e.g., TCP/IP) is used to transfer the messages between the antennas and the combiner. Immediate arrival of each message offers near real-time action on the information. For example, in one embodiment, as RF metrics from each antenna are received, the weights to apply to the received signals for combining may be updated (e.g., weights calculated based on Es/N0 values from tracking receivers on the antennas.)

Thus, the controller for the combiner is capable of continuous communication with connected antennas to gather antennas metrics, including, for example, the quality of RF signal from each antenna, for use in performing combiner operations.

Figure 3:
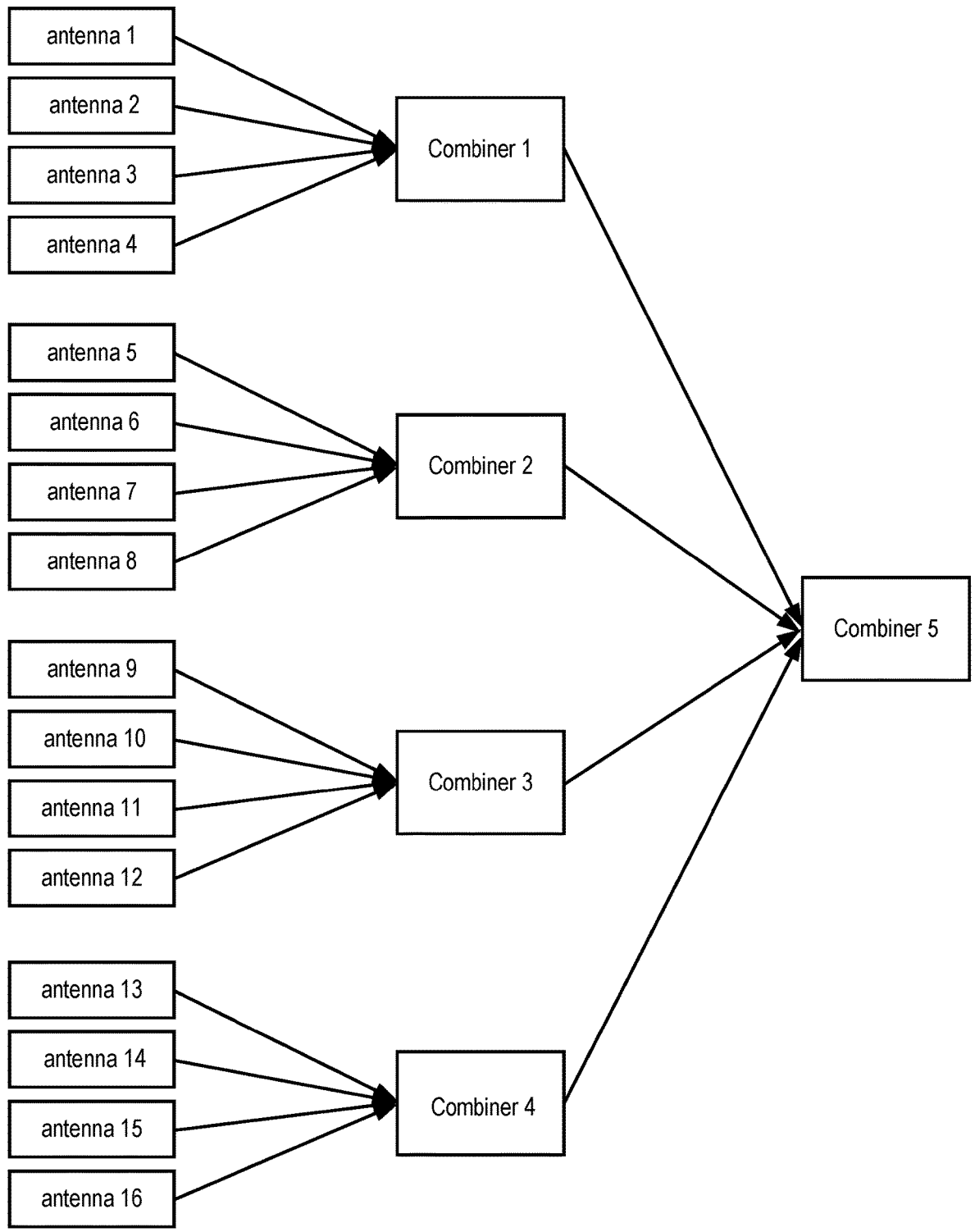
FIG. 3 illustrates sixteen antennas connected via four combiners with another combiner.

In one embodiment, the combiner is used in a cascaded combiner. In cascaded systems, in one embodiment, a combiner uses metrics from lower tiers in the system as part of the calculations. FIG. 3 illustrates sixteen antennas (1-16) are connected with four combiners (e.g., combiners 1-4).

Four combiners 1-4 are also connected with another combiner (e.g., combiner 5). In one embodiment, each of the four combiners (1-4) outputs, to the fifth combiner (e.g., combiner 5), a combined metric for the signals received by its connected antennas (e.g., a combined estimated Es/N0 for what its combined signal would be, etc.). The last combiner (5) receives these four estimated Es/N0s and takes actions based on those metrics.

Note that a combiner may not combine signals from all its connected antennas in all cases. This may occur for a number of reasons. One such reason is that the subscriber's preference is a low-cost connection (e.g., lower signal rates) and not combining results in a lower connection cost. This may also be the case of its signal quality (e.g., Es/N0, SNR) being below a threshold. In such a case, the signal is not part of the combining processes. In one embodiment, the signal is removed from the combining process by setting its weight (signal contribution) to zero.

Dynamic Combining Recovery

Embodiments of the invention include a process for combining to recover when signals received from antennas are improved after degradation or even completely lost because an antenna lost a lock to a satellite. In this manner, signal re-acquisition provides fault tolerant signal combining.

In one embodiment, while normally RF signals are received by antennas and sent to a combiner to combine the signals into a single signal that is sent to a modem, if an antenna loses lock to a satellite, any received RF signals from the antenna that are sent to the combiner are not used in the addition of signals that are used to generate the single combined signal. After the antenna re-acquires a lock to a satellite, received signals from this antenna are automatically picked up and used for combining by the combiner. In this manner, the quality of combined signal may be recovered shortly after signal characteristics are improved on antenna side or when the antenna re-acquires a lock to a satellite.

In one embodiment, once the RF signal from an antenna is at or above a certain signal quality (e.g., a certain SNR level) or the antenna reacquires a lock to a satellite, its signal is included in the received signal combining. No human intervention is required to restore combining. Because combining is done with signals of a certain quality level and/or signals that are from antennas with physical layer satellite locks, an optimal combined signal can be obtained.

In one embodiment, information about an antenna is provided to the combiner to allow the combiner to make more informed decisions on its signal quality than in conventional maximal-ratio combiners. In one embodiment, the decision on whether to use a received signal from any particular antenna (e.g., flat panel antenna, etc.) in combining is made after analyzing the radio-frequency (RF) metrics received from the antenna that received signal. In one embodiment, based on signal quality metrics received from each antenna, a weight is assigned to the signal and this weight determines an amount the received signal from the antenna will contribute to the combined output signal that is generated by combining the signals from the antennas to the modem. However, the controller of the combiner using a controlling process (CP) can decide not to use the signal from one or some antenna at all. For example, in one embodiment, each antenna constantly provides an indication to the combiner that it has physical layer lock with the satellite. In one embodiment, this indication is in the form a physical layer lock (PL sync) signal provided by each antenna to the combiner. In one embodiment, if physical layer lock is lost and the PL sync signal is no longer provided by the antenna to the combiner, which happens if physical layer frames synchronization (as indicated by a PL sync signal read by the combiner from the antenna) wasn't achieved, the weight to apply to the received signal from that antenna for the combining process is zero and the received signal does not contribute to the combined received signal that the combiner sends to the modem. In another embodiment, this indication is in the form of a signal or indicator that specifies that the received signal from the antenna should be combined or should not combined. In one embodiment, this signal or indicator indicates that the received signal is not the signal the modem is expecting. In another embodiment, the system checks the lock from the modem and then uses the correlator (that correlates the signals) to determine if the other antennas are on the same signal.

In one embodiment, because metrics are sent by antennas constantly, a signal from an antenna may be automatically added into combining process once its signal quality has increased. This is important because the quality of signal received by antenna is not constant in time. Combining signals from multiple antennas when one or more of the signals has low quality signal decreases output signal quality. Hence, there is a need to automatically determine during combiner operation which signals from which antennas to use for combining and in what proportion.

Figure 4:
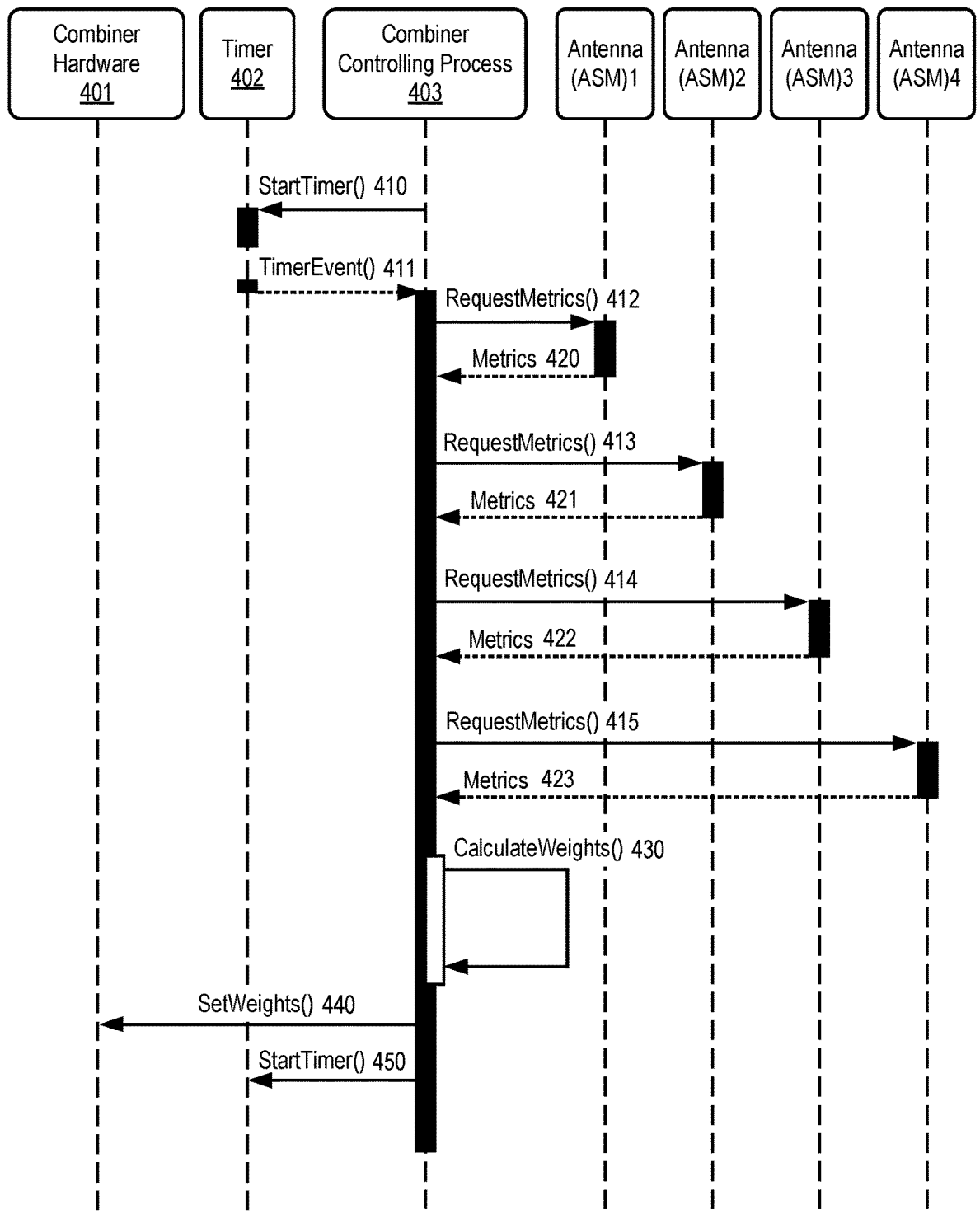
FIG. 4 illustrates one embodiment of the process for generating weights for receive signal combining.

FIG. 4 is a flow diagram of one embodiment of a process for combining. In one embodiment, the process is performed by hardware and software of the combiner.

After initial setup, the combiner controlling process (CP) 403 sets a timer 402 to a certain amount of time 410. In one embodiment, the timer is set to an amount equal to the frame rate of the antenna (e.g., 4 ms). Once the time is up, the timer fires (411), thereby triggering the running of combiner weights adjustment procedure in the CP to determine the weight to apply during combined based on the signal quality metric (e.g., SNR).

During this procedure, in one embodiment, the CP sends requests 412-415 for metrics to each of the connected antennas, and each of the antennas responds with the metrics 420-423. In another embodiment, the antenna aperture measures the signal quality (e.g., Es/N0) and then streams it to the combiner, which will consume and use the most current Es/N0 estimate. In such a case, requests 412-415 are not required.

Next, the CP calculates new weights for each channel 430. In one embodiment, the antenna metrics are inputs to the calculation. Once CP finishes the calculation, new weights are sent to the combiner hardware (440). As described above, signals from some of the antennas may be excluded from combining based on the CP decision.

Thereafter, the timer is set again (450) and the process repeats.

Combined Antennas Controlled as Single Antenna

In one embodiment, multiple antennas are used for communication with a satellite controlled from a device (e.g., modem) as a single antenna. In one embodiment, the modem uses a point-to-point protocol, such as, for example, but not limited to, OpenAMIP®, to control the multiple antennas as a single antenna. Since the modem communicates with a single entity, a combiner, as far as the modem is concerned, it is controlling a single antenna. While a single connected antenna would normally send its data back directly to the modem, in one embodiment, the combiner receives the signals from all the connected antennas and sends the appropriate data to the modem. In other words, the combiner presents a single interface to the modem and handles the dissemination of control information among the connected antennas (e.g., flat panel antennas) and consolidates data returned from the antennas (e.g., flat panel antennas), sending only the appropriate data to the modem. In one embodiment, this allows the combined system to provide improved information to the modem compared to a single antenna system (e.g. if one antenna in the combined system is not able to lock onto the current satellite due to line of site restrictions, it may search unrestricted portions of the sky to inform the modem of other beam options that might be available).

In one embodiment, the combiner selects the appropriate data to send the modem based on signals from the modem. For example, if the modem sends a request to link to a particular satellite, the combiner sends that request to all the antennas to which it is connected. If only one antenna is able to link to the satellite, the combiner only indicates to the modem that the linking operation was successful (i.e., appropriate data) and does not send the responses of antennas that could not link to the satellite (i.e., not appropriate data) because the modem's request is met by at least one of the antennas. As another example, in one embodiment, the combiner combines signals from the antennas to produce one signal that is forwarded to the modem. If a signal from one of the antennas is not correlated to the others or is related to a transmission that is unrelated to the other antennas (e.g., a signal from communication with another satellite), then the combiner would not use that signal to create the combined signal that is sent to the modem as that data could impact the combined signal and is not appropriate data. Thus, the techniques disclosed herein provide a method to control multiple antennas from a single modem. This is advantageous in that it doesn't require changes to existing modems or existing antennas, including existing modems and antennas that use point-to-point protocols (e.g., OpenAMIP®).

In one embodiment, the modem uses a point-to-point protocol to communicate between the modem and the combiner. Because the combiner is forwarding these communications to the antennas, the point-to-point protocol is being used as a point-to-multi-point protocol. In one embodiment, OpenAMIP® is used to communicate between the modem and the combiner and between the combiner and each antenna (e.g., each antenna uses OpenAMIP® to send selected data back to the combiner). This data may be responses to control data or status data received from the combiner and/or the modem via the combiner.

In an alternative embodiment, the modem uses a protocol different than OpenAMIP® to communicate with the combiner, and the combiner continues to use OpenAMIP® to communicate with antennas or vice versa. In alternative embodiment, both the modem-to-combiner and/or combiner-to-antenna communications can be through a protocol other than OpenAMIP®. In yet still another embodiment, the modem does not control any antenna directly (Single Channel Per Carrier (SCPC) or other static installation), and the combiner is modified to become "master controller" rather than an intermediary disseminator to the antennas. In other words, the combiner can be the original source of commands to the antennas instead of the modem. This works, for example, when there is only one satellite with which the combined system is working.

Figure 5:
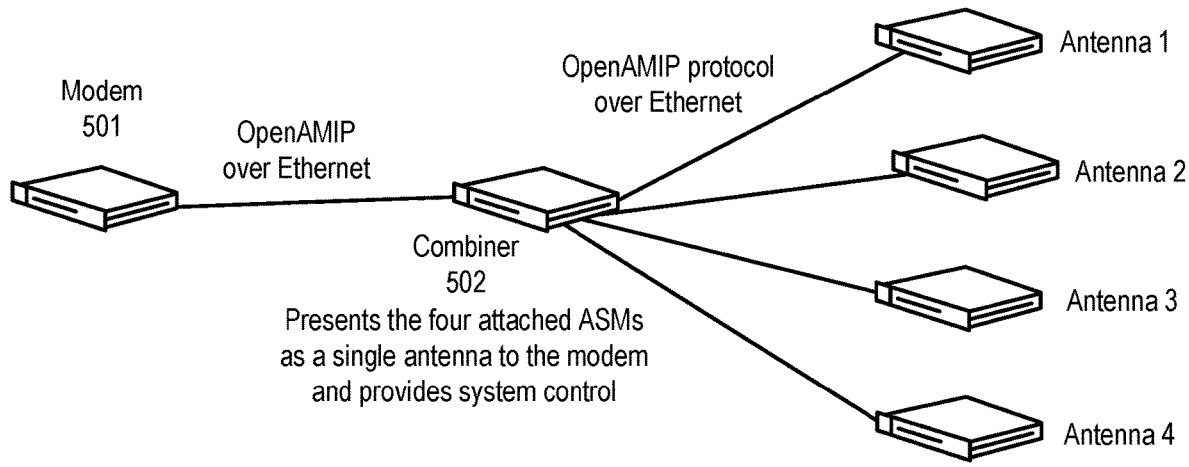
FIG. 5 illustrates a combined terminal in which a modem is communicably connected to a combiner, which in turn is communicably connected to multiple antennas.

FIG. 5 illustrates a combined system in which a modem 501 is communicably connected to a combiner 502, which in turn is communicably connected to multiple antennas 1-4. While four antennas are shown, the techniques disclosed herein are not limited to four antennas and may be used with less than four antennas or greater than four antennas.

In one embodiment, modem 501 is communicably connected to combiner 502 and combiner 502 is communicably connected to multiple antennas 1-4 via an Ethernet connection. In one embodiment, the protocol for the Ethernet connection is OpenAMIP®.

Figure 6:
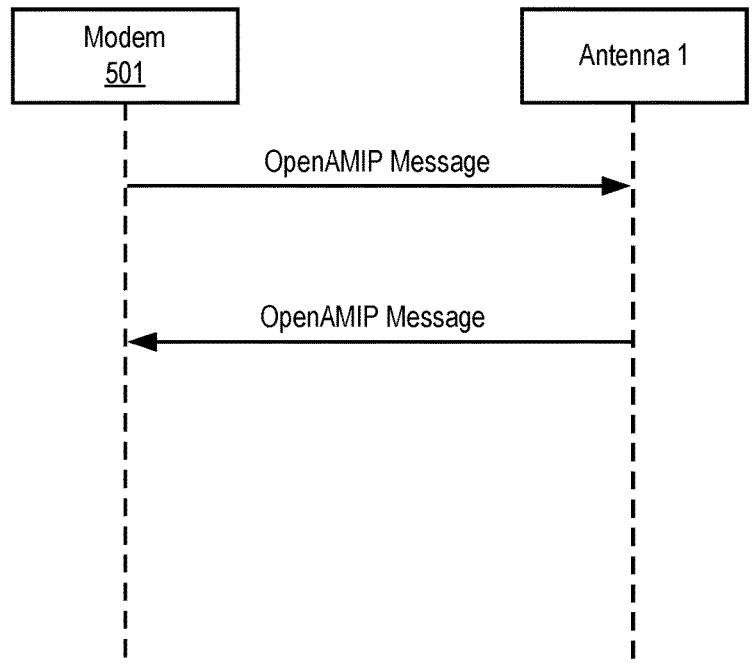
FIG. 6 illustrates one embodiment of a single antenna system in which the modem uses messages (e.g., an Open Antenna Modem Interface Protocol (OpenAMIP®) message to communicate with and control a single antenna, even though multiple antennas are connected to the combiner.

FIG. 6 illustrates a single antenna system in which modem 501 uses OpenAMIP® to communicate with and control a single antenna, even though multiple antennas are connected to combiner 502.

Figure 7:
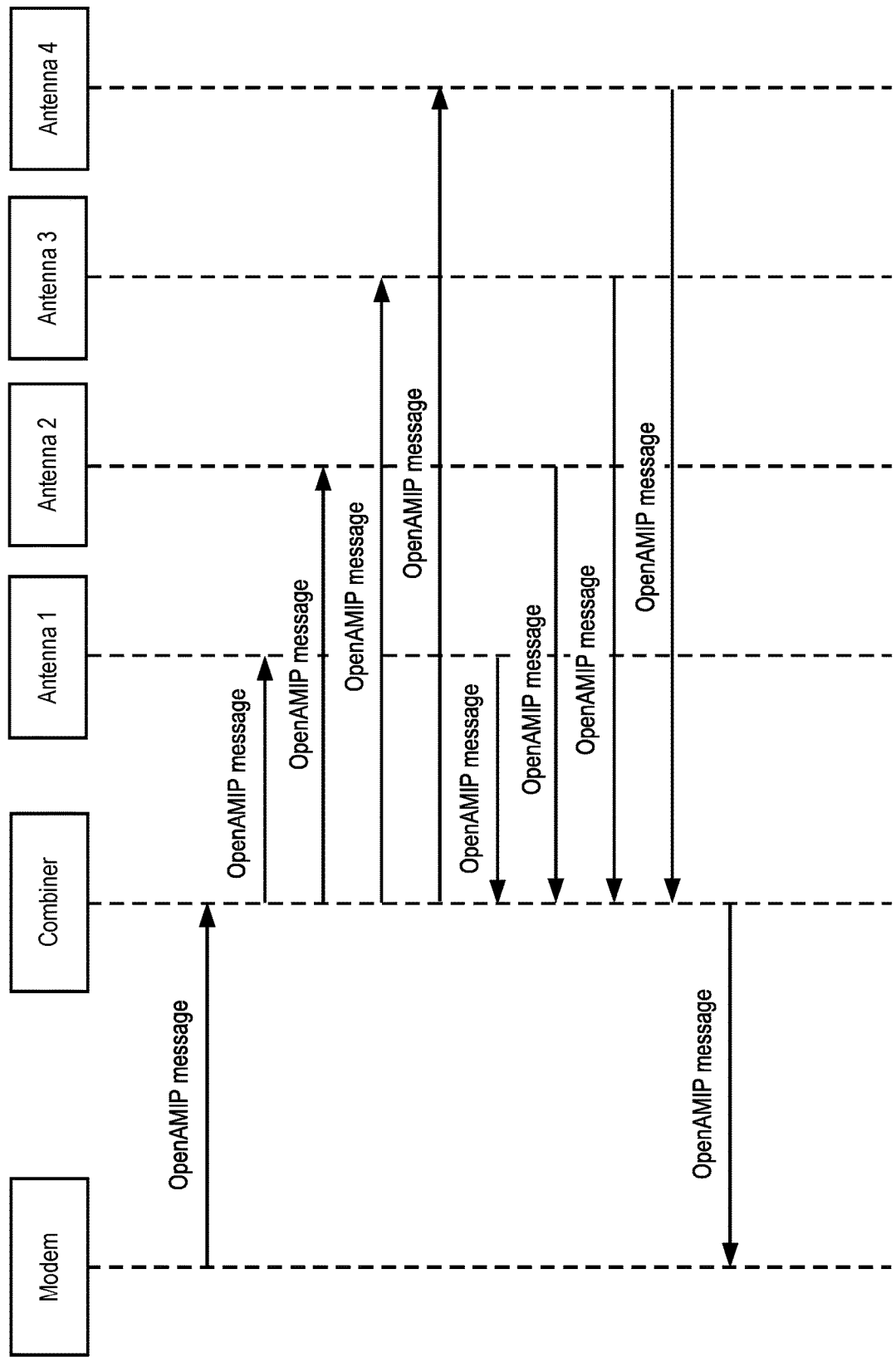
FIG. 7 illustrates a modem sending an OpenAMIP® message (or other message) to the combiner, which forwards the same message to multiple antennas.

FIG. 7 illustrates a modem sending an OpenAMIP® message to the combiner, which forwards that same message to each of the four antennas. Thus, the modem sends the same information to all of the antennas even though it operates as if only one antenna is in the system. In response to the message from the combiner (and originally sent by the modem), each of the four antennas sends another OpenAMIP® message to the combiner. These messages may include antenna status information. In response to the OpenAMIP® messages from the antennas, the combiner decides which information to send back to the modem. In this manner, the combiner takes the status from all the antennas and sends back the appropriate status. Generally, in one embodiment, messages from the antenna that acts as the transmit antenna for the system are sent back to the modem.

In another embodiment, each antenna also uses a different interface to send signal metrics to the combiner, which it uses in its combining and arbitrating algorithms. These algorithms are described in more detail below. In one embodiment, the interface can be implemented in various ways, including, for example, UDP or TCP over Ethernet.

Furthermore, the combiner takes certain information from the antennas and aggregates it. In one embodiment, this include GPS coordinates, SNR or other signal quality metrics (from tracking receivers on the ASM), and search count indicating the number of complete searches performed by the antenna. In one embodiment, if one antenna finds the satellite, the combiner maintains the search count sent to the modem at zero.

In one embodiment, at least some of the messages from the modem to the antennas are stored by the combiner. This is helpful when rebooting an antenna (e.g., the flat panel antenna). In such a case, these messages can be accessed to determine the current set up of the antenna.

In one embodiment, the combiner sends "keep alive" messages to both the modem and the antennas (e.g., flat panel antennas). For example, in one embodiment, when the modem disconnects from the combiner, the combiner stops sending "keep alive" messages to the antennas (e.g., flat panel antennas). At times, the antenna designated for transmit keeps receiving keep alive messages from the combiner. At other times, the combiner maintains keep alive messages to all antennas in absence of modem connections.

Combiner Acts as Router for an Antenna (Both RF and Network Control)

The techniques disclosed herein provide network access, facilitated by a system that includes one or more antennas, a combiner, and a modem. In one embodiment, this is accomplished with minimal duplication of work or physical components. In one embodiment, the system provides complete and transparent connectivity of all elements of the system to all other elements of the system. In one embodiment, this system facilitates access to an Internet connection provided by the system for all connected devices. In other words, in one embodiment, network availability is facilitated by the various elements of the system acting in concert, to make the network available to all elements of the system, while still understanding the decoded signal is segmented across several special-purpose devices (antenna, RF combiner, modem, . . . ). In one embodiment, using the techniques disclosed herein, expensive hardware components used in demodulation, can be omitted from devices that would only require them for sharing network information. Also, the signal provided by the antennas and combined by the combiner is demodulated at the modem, and the network that is derived from that RF data by the modem is made available through the combiner to all other elements of the system.

More specifically, in one embodiment, all elements of a system may communicate with each other. In one embodiment, this communication is performed over Ethernet and through radio-frequency (RF) cables attached between the combiner and each antenna and between the modem and the combiner. The Ethernet connections allow messaging between the combiner and the antennas. The RF connections allow the signals received from the system's antennas to be combined by the combiner to complete the signal loop required by the modem to communicate with the remote link through satellite. This communication with each other allows the system to build a connection to the rest of the Internet (or another network). Thus, the individual components with their own tasks to perform as part of the network terminal work together to allow each component of the system to be more capable since the connectivity between components produces the overall connection to the network (e.g., the Internet).

This is advantageous for a number of reasons. For example, a simplified distributed arrangement reduces repeated hardware offering cost savings. This distributed arrangement simplifies the problem by only required components to know about a small part of the overall communication mechanisms. Furthermore, in one embodiment, the combiner could provide for one or more components (for antennas only), such as, for example, network firewall, DNS, proxy, data cache, VPN tunneling, etc. Thus, using a low-fidelity modem without managing modem configuration across networks, the combiner could act as a high-end router for the combiner(s) and antenna(s).

Figure 8:
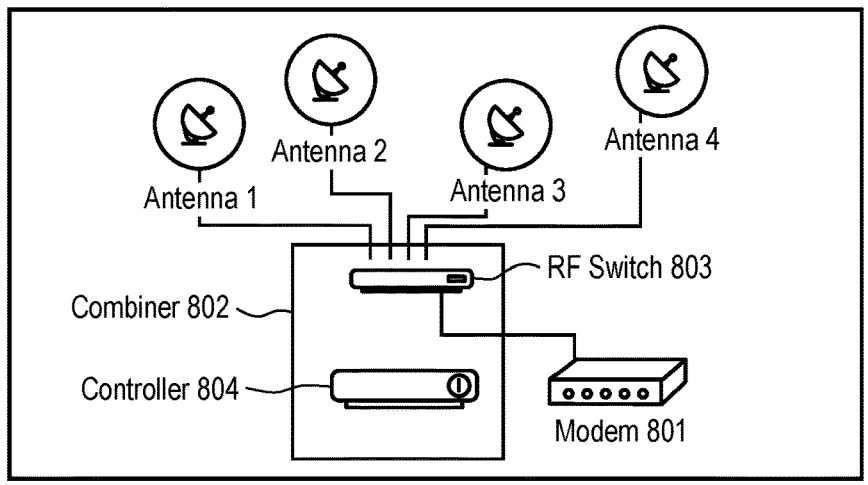
FIG. 8 illustrates an RF transmit (Tx) path of a system with a network connection.
Figure 9:
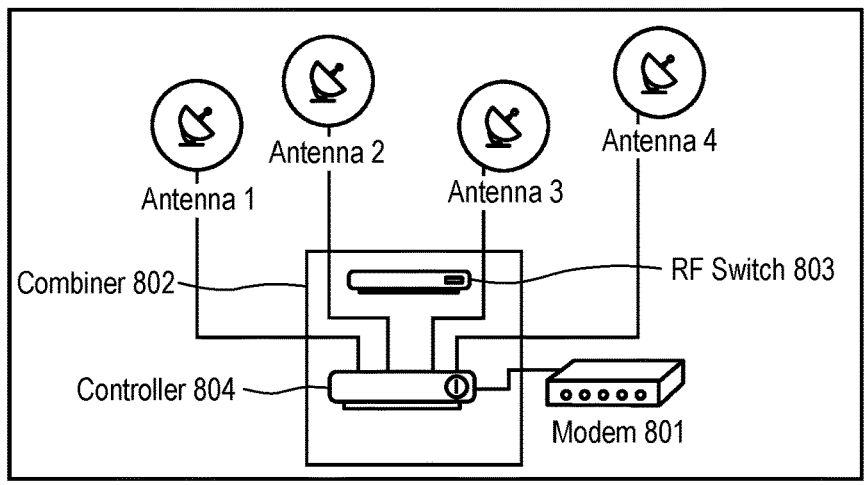
FIG. 9 illustrates an RF receive (Rx) path of a system with a network connection.
Figure 10:
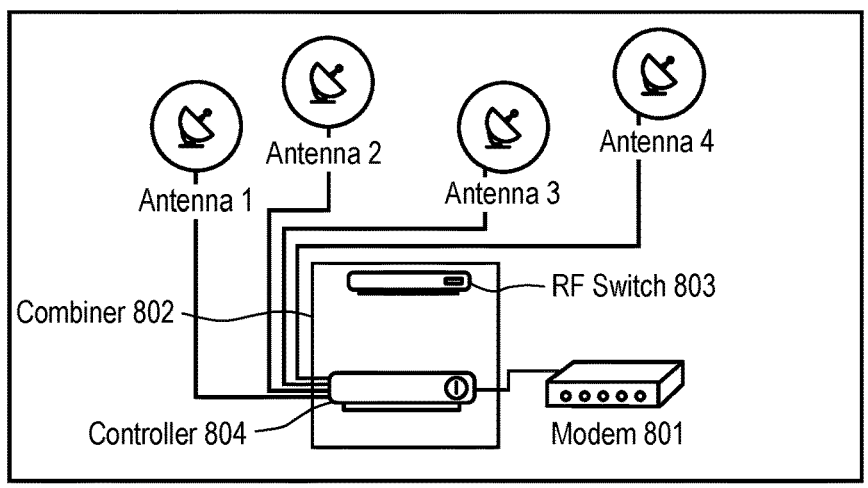
FIG. 10 illustrates an Ethernet path of a system.

FIG. 8 illustrates an RF transmit (Tx) path with a system. Referring to FIG. 8, transmit RF energy is sent from the modem 801 to the antenna through combiner 802. FIG. 9 illustrates an RF receive (Rx) path of the system. Referring to FIG. 9, the receive RF energy is collected by the antenna, demodulated, aligned, combined, and modulated in the combiner by controller 804, and then delivered to modem 801 for demodulation. FIG. 10 illustrates an Ethernet path. In this case, Ethernet messages are communicated between each of the antennas and a combiner and between the modem and each of the antennas.

Thus, FIGS. 8-10 illustrate enabling an antenna and a combiner with a single modem connection to a network (e.g., the Internet). The RF path is used to get the Internet connection and, the antennas and combiner all use the same Internet connection through that modem, which provides the Internet connection. Thus, even if one or more of the antennas is not directed to the correct satellite, an Internet connection can still be obtained.

Another benefit of such a system is that the system can act as a cache sharing information between antennas that normally would require multiple individual requests to obtain the same information for each antenna (e.g., software update packages for an antenna). This reduces the cost for transmitting the information per antenna.

In another embodiment, the techniques described herein may be used to have multiple antennas (e.g., two different antennas) looking at different signals and the modem is looking for different signals, particularly if the antenna is currently blocked. This may be beneficial in applications (e.g., a cruise ship) where multiple antennas could receive and transmit multiple, different signals to different satellites to more efficiently use those antennas and coordinate based on sky visibility.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 11:
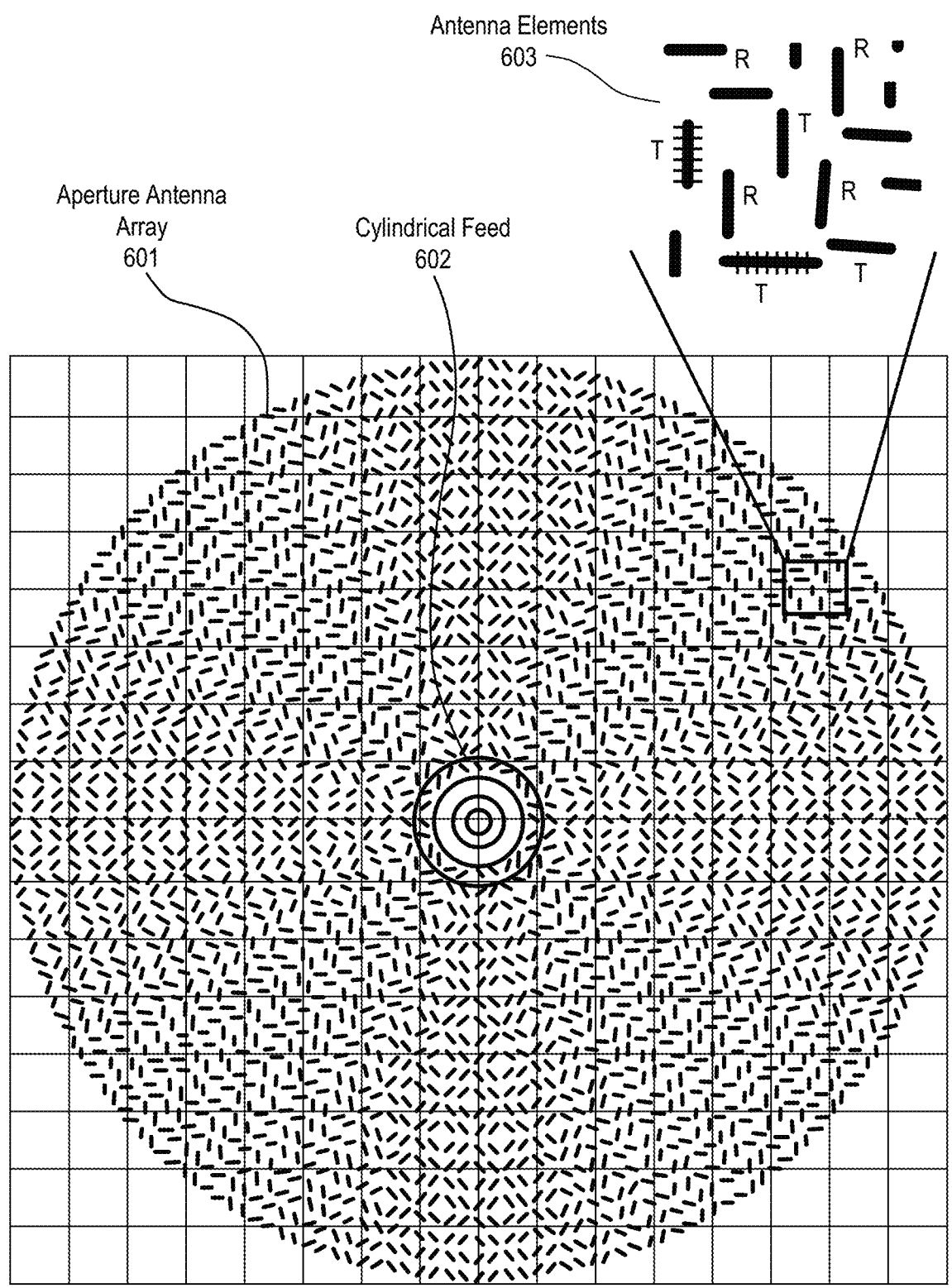
FIG. 11 illustrates the schematic of one embodiment of a cylindrically fed holographic radial aperture antenna.

FIG. 11 illustrates the schematic of one embodiment of a cylindrically fed holographic radial aperture antenna. Referring to FIG. 11, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 11 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELL") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 12:
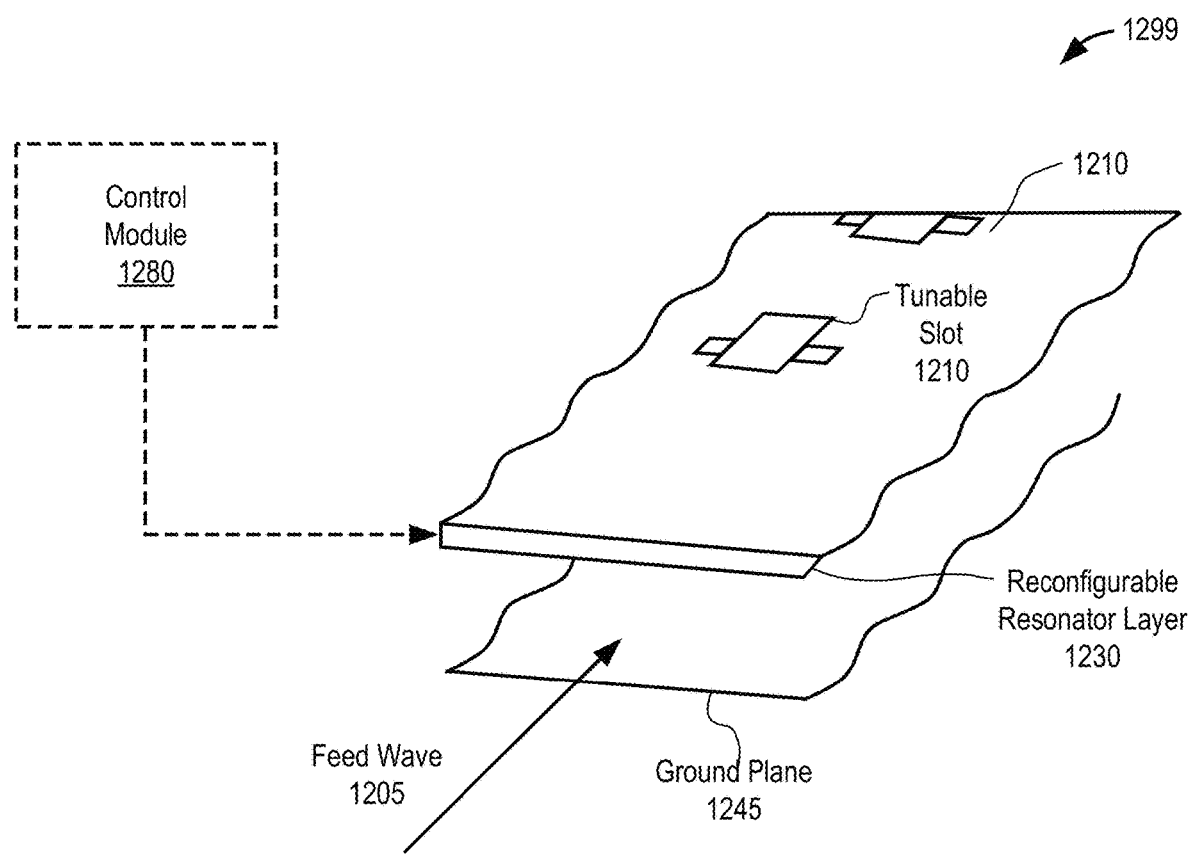
FIG. 12 illustrates a perspective view of one row of antenna elements that includes a ground plane and a reconfigurable resonator layer.

FIG. 12 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 13A:
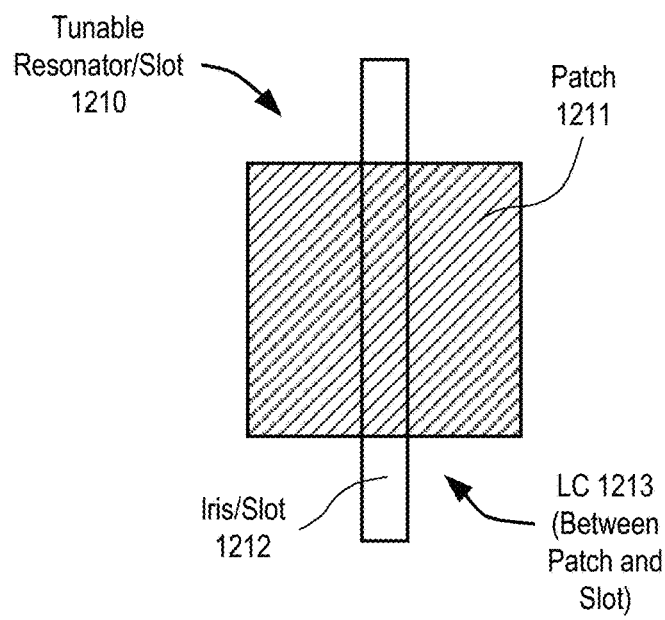
FIG. 13A illustrates one embodiment of a tunable resonator/slot 1210.

Control module 1280 is coupled to reconfigurable resonator layer 1230 to modulate the array of tunable slots 1210 by varying the voltage across the liquid crystal in FIG. 13A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w^*_{in} w_{out}$, with $w_{in}$ as the wave equation in the waveguide and $w_{out}$ the wave equation on the outgoing wave.

FIG. 13A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 13B:
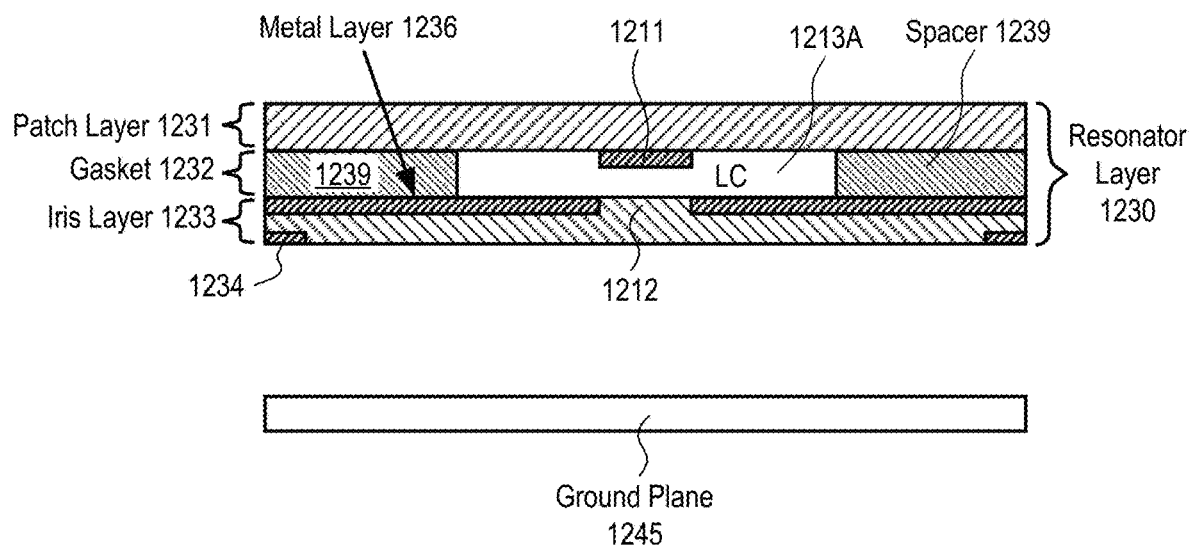
FIG. 13B illustrates a cross section view of one embodiment of a physical antenna aperture.

FIG. 13B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 13B includes a plurality of tunable resonator/slots 1210 of FIG. 13A. Iris/slot 1212 is defined by openings in metal layer 1236. A feed wave, such as feed wave 1205 of FIG. 13A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 13B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 13B includes multiple tunable resonator/slots, such as tunable resonator/slot 1210 includes patch 1211, liquid crystal 1213, and iris 1212 of FIG. 13A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, ×/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 14A-D illustrate one embodiment of the different layers for creating the slotted array. The antenna array includes antenna elements that are positioned in rings, such as the example rings shown in FIG. 14A. Note that in this example the antenna array has two different types of antenna elements that are used for two different types of frequency bands.

Figure 14A:
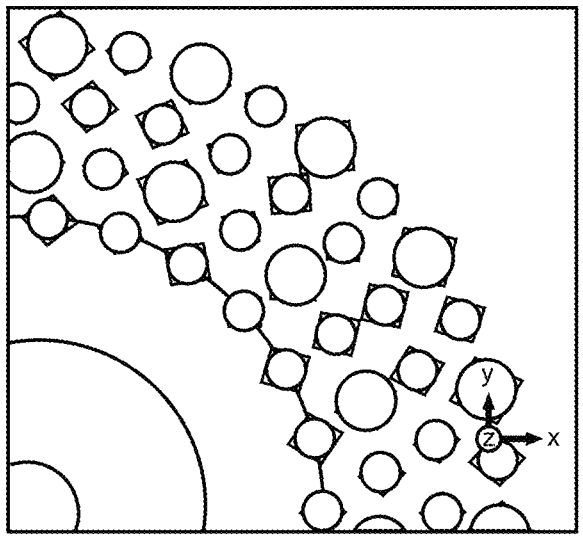
FIG. 14A illustrates a portion of the first iris board layer with locations corresponding to the slots.
Figure 14B:
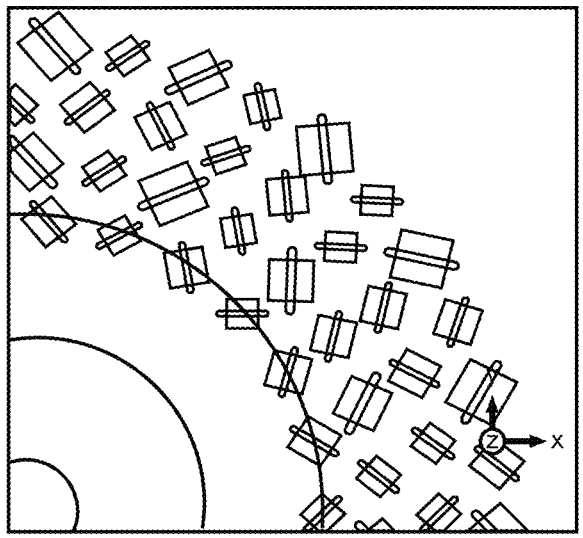
FIG. 14B illustrates a portion of the second iris board layer containing slots.
Figure 14C:
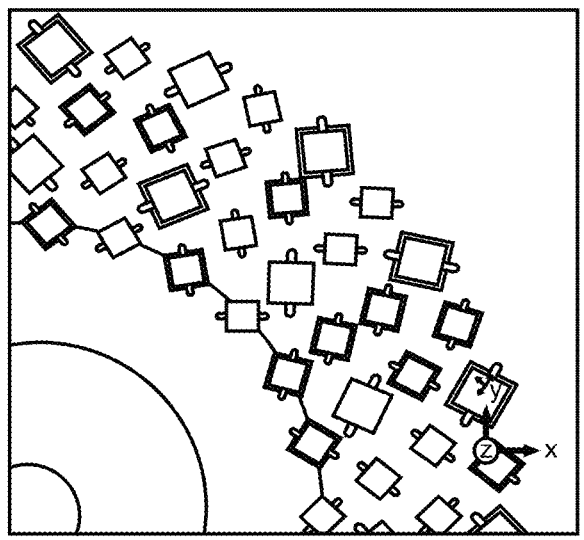
FIG. 14C illustrates patches over a portion of the second iris board layer.
Figure 14D:
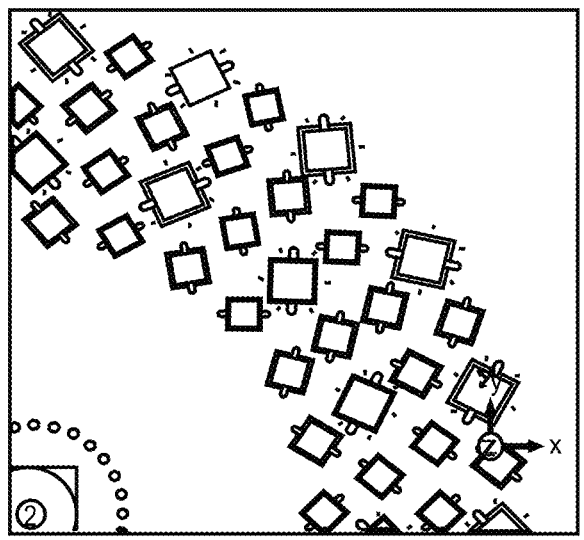
FIG. 14D illustrates a top view of a portion of the slotted array.

FIG. 14A illustrates a portion of the first iris board layer with locations corresponding to the slots. Referring to FIG. 14A, the circles are open areas/slots in the metallization in the bottom side of the iris substrate, and are for controlling the coupling of elements to the feed (the feed wave). Note that this layer is an optional layer and is not used in all designs. FIG. 14B illustrates a portion of the second iris board layer containing slots. FIG. 14C illustrates patches over a portion of the second iris board layer. FIG. 14D illustrates a top view of a portion of the slotted array.

Figure 15:
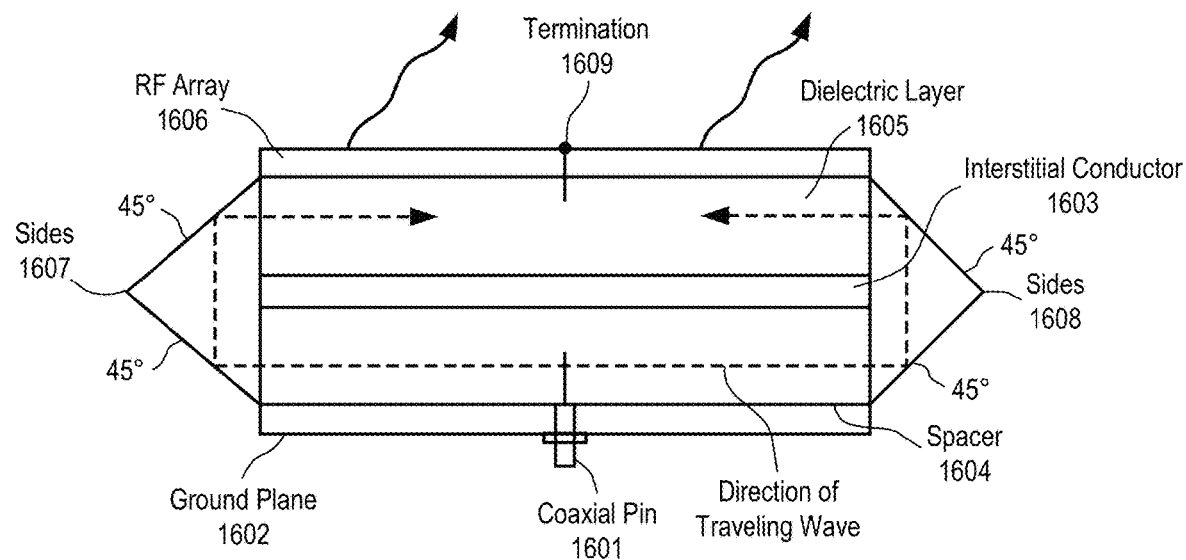
FIG. 15 illustrates a side view of one embodiment of a cylindrically fed antenna structure.

FIG. 15 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 15 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 15, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 15 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 16:
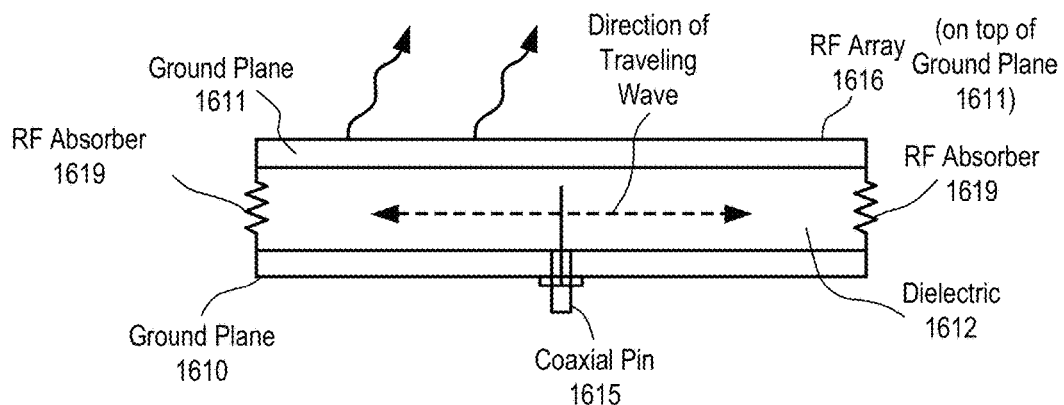
FIG. 16 illustrates another embodiment of the antenna system with an outgoing wave.

FIG. 16 illustrates another embodiment of the antenna system with an outgoing wave. Referring to FIG. 16, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 15 and 16 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 15 and RF array 1616 of FIG. 16 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

In one embodiment, the antenna elements are placed on the cylindrical feed antenna aperture in a way that allows for a systematic matrix drive circuit. The placement of the cells includes placement of the transistors for the matrix drive.

Figure 17:
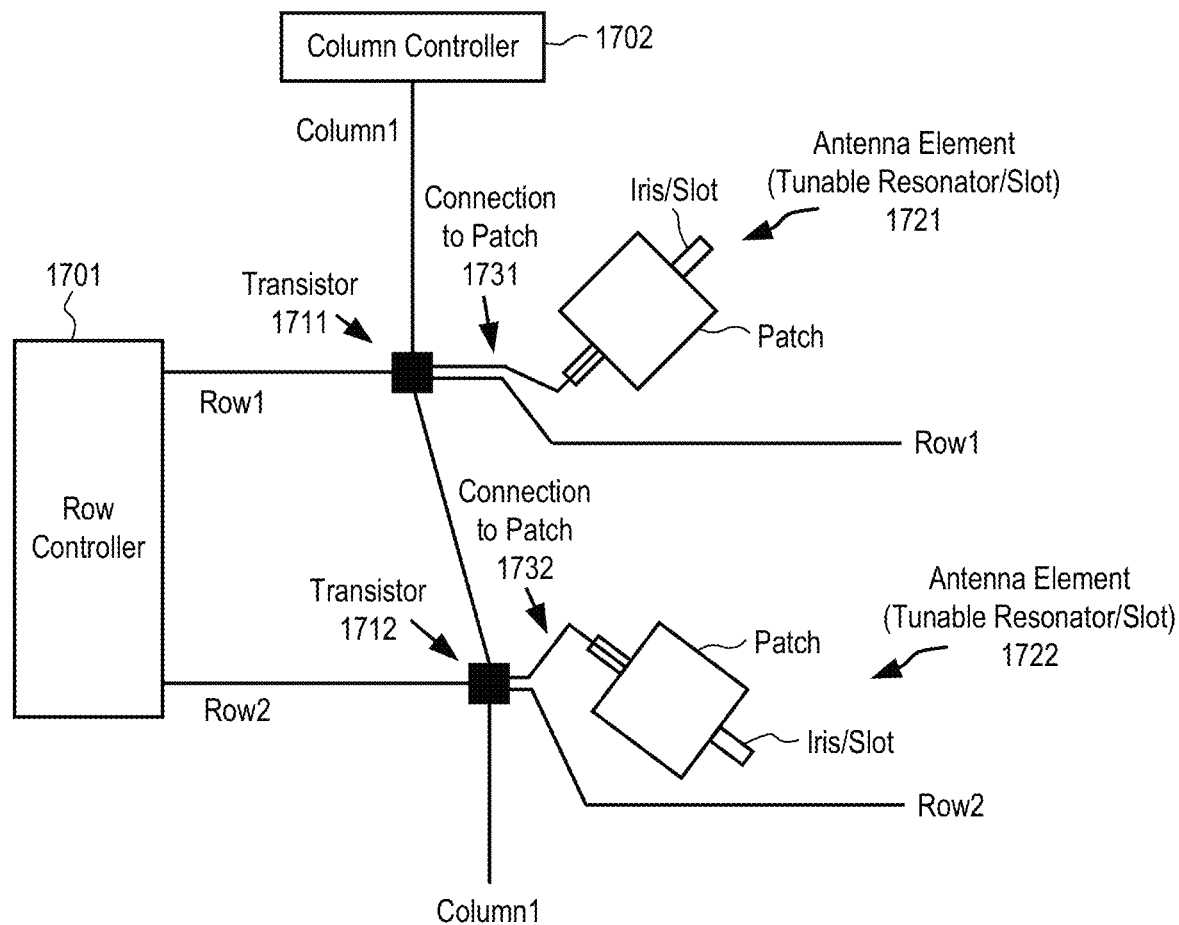
FIG. 17 illustrates one embodiment of the placement of matrix drive circuitry with respect to antenna elements.

FIG. 17 illustrates one embodiment of the placement of matrix drive circuitry with respect to antenna elements. Referring to FIG. 17, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 18:
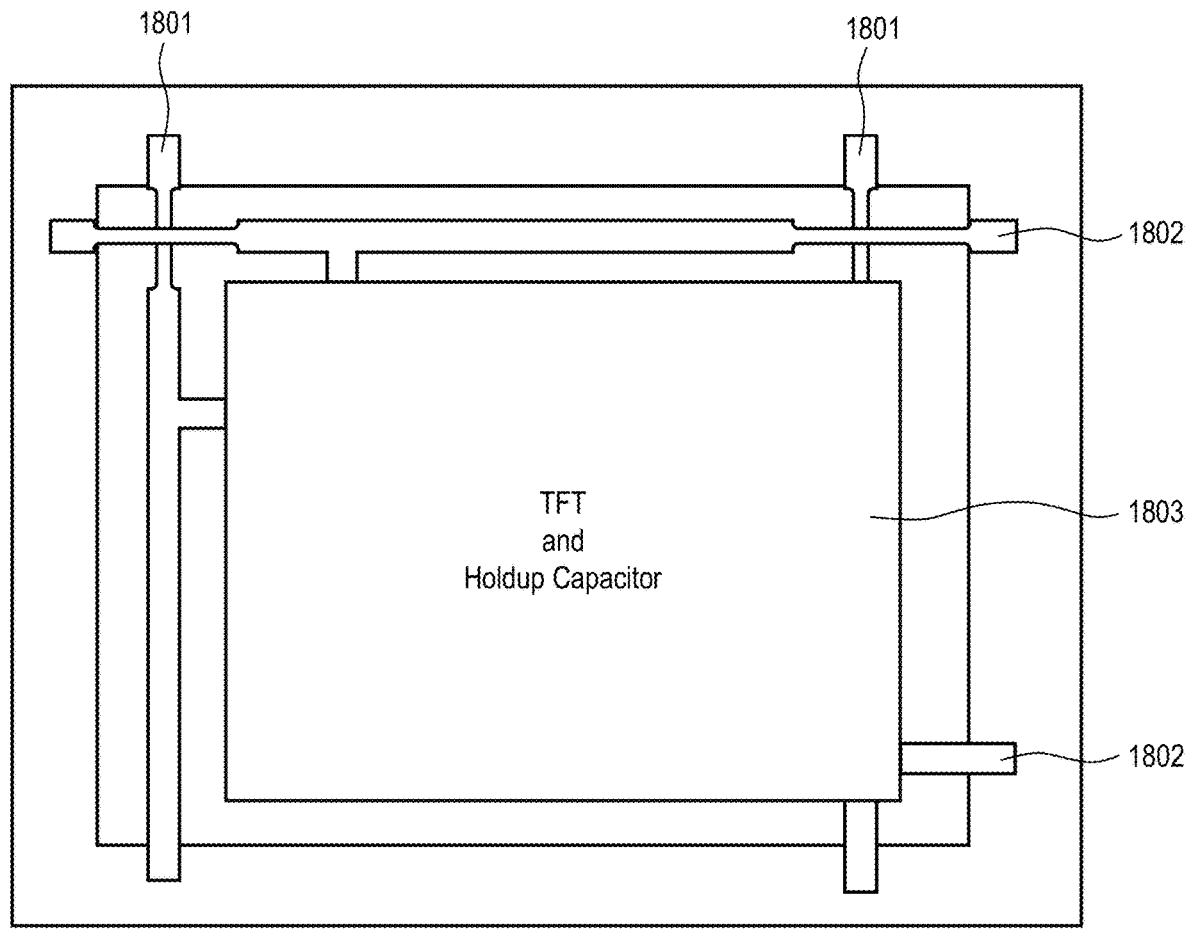
FIG. 18 illustrates one embodiment of a TFT package.

In one embodiment, a TFT package is used to enable placement and unique addressing in the matrix drive. FIG. 18 illustrates one embodiment of a TFT package. Referring to FIG. 18, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 19:
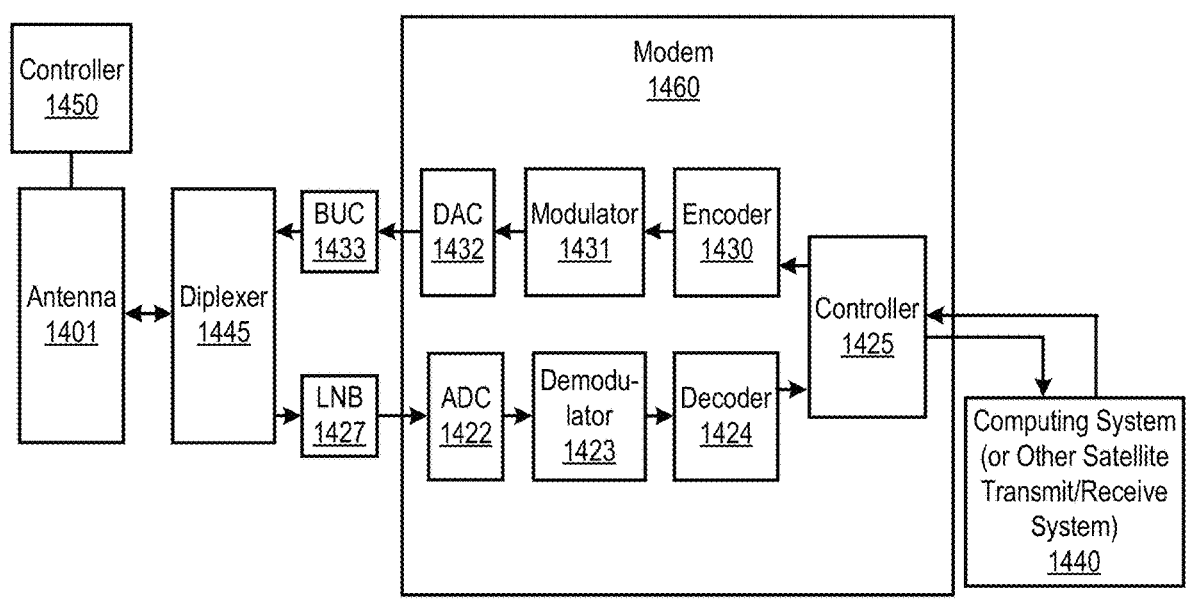
FIG. 19 is a block diagram of another embodiment of a communication system having simultaneous transmit and receive paths.

In another embodiment, the combined antenna apertures are used in a full duplex communication system. FIG. 19 is a block diagram of another embodiment of a communication system having simultaneous transmit and receive paths. While only one transmit path and one receive path are shown, the communication system may include more than one transmit path and/or more than one receive path.

Referring to FIG. 19, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 19 has a number of applications, including but not limited to, internet communication, vehicle communication (including software updating), etc.

There are a number of example embodiments described herein.

Example 1 is an apparatus comprising a plurality of antennas that each have a transmit aperture and a receive aperture and are operable to receive correlated signals from a satellite, wherein the receive aperture is operable to receive one of the signals from the satellite and determine its signal quality; a combiner communicably coupled to the plurality of antennas to combine multiple signals received from the plurality of antennas into one signal, wherein the combiner is operable to determine which signals received by the plurality of antennas are to be combined into the one signal based, at least in part, on at least one signal quality metric regarding the signals, the at least one signal quality metric being received from one or more tracking receivers external to the combiner; and a modem communicably coupled to receive the one signal from the combiner, wherein the modem is operable to send information to the plurality of antennas via the combiner as if only a single antenna is coupled to the combiner and the combiner is operable to aggregate information for the modem received from antennas in the plurality of antennas as if one single antenna provided the information to the combiner, thereby enabling the combiner to present the plurality of antennas as the single antenna and the modem to communicate via the combiner as if controlling one single antenna.

Example 2 is the apparatus of example 1 that may optionally include that each of the one or more tracking receivers are part of a distinct one of the plurality of antennas.

Example 3 is the apparatus of example 1 that may optionally include that the combiner is operable to select signals received from the plurality of antennas for combining based on a control signal received from each of the plurality of antennas.

Example 4 is the apparatus of example 3 that may optionally include that the control signal comprises a signal indicating whether the antenna has a physical layer lock with the satellite.

Example 5 is the apparatus of example 4 that may optionally include that, responsive to receiving the control signal indicating one antenna of the plurality antennas does not have physical layer lock with the satellite, the combiner does not combine the signal from the one antenna with one or more signals received from the other antennas, and subsequently upon receiving the control signal indicating one antenna of the plurality antennas has physical layer lock with the satellite, then the combiner dynamically selecting the signal from the one antenna for combining with one or more signals received from the other antennas.

Example 6 is the apparatus of example 3 that may optionally include that the combiner is operable to select signals received from the plurality of antennas for combining based on a control signal for each signal indicative of whether the signal is to be combined.

Example 7 is the apparatus of example 1 that may optionally include that the combiner is operable to obtain signal metrics from the antennas on predetermined regular intervals related to antenna frame rate of the plurality of antennas.

Example 8 is the apparatus of example 1 that may optionally include that the combiner is operable to combine the signals by coherently summing the signals using Maximal Ratio combining, equal gain combining, switched combining, or selection combining.

Example 9 is the apparatus of example 1 that may optionally include that the combiner is communicably coupled to the modem using a first point-to-point communication protocol and to each antenna in the plurality of antennas using a second point-to-point communication protocol.

Example 10 is the apparatus of example 1 that may optionally include that at least one of the first and second point-to-point communication protocols comprises OpenAMIP®.

Example 11 is the apparatus of example 1 that may optionally include that the combiner uses binary or text messages to communicate with the antennas on a continuous basis to obtain one or more antenna metrics from antennas in the plurality of antennas.

Example 12 is the apparatus of example 1 that may optionally include that the combiner aggregates search count information from the plurality of antennas and sends the aggregated search count information to the modem.

Example 13 is the apparatus of example 1 that may optionally include that the signal quality comprises Es/N0 information regarding the signal received by the antenna.

Example 14 is the apparatus of example 1 that may optionally include that the modem provides a single modem connection to a network for the plurality of antennas.

Example 15 is the apparatus of example 14 that may optionally include that the network is the Internet.

Example 16 is the apparatus of example 1 that may optionally include that the combiner is coupled to the plurality of antennas and the modem via both RF cables and a network cable, and wherein the network cable comprises an Ethernet cable for an Ethernet communication path between the plurality of antennas, the combiner and the modem.

Example 17 is a method comprising sending signals received by a plurality of antennas that each have a transmit aperture and a receive aperture from a satellite; determining, by each antenna of the plurality of antennas, signal quality for its respective received signal; combining, by a combiner coupled to the plurality of antennas, multiple signals received from the plurality of antennas into one signal, including determining which signals received by the plurality of antennas are to be combined into the one signal based, at least in part, on at least one signal quality metric regarding the signals, the at least one signal quality metric received from one or more tracking receivers external to the combiner; and sending the one signal from the combiner to a modem, and further comprising sending, by the modem, information to the combiner for the plurality of antennas as if the plurality of antennas are only a single antenna, and aggregating, by the combiner, information for the modem received from antennas in the plurality of antennas as if the single antenna provided the information to the combiner.

Example 18 is the method of example 17 that may optionally include selecting, by the combiner, signals received from the plurality of antennas for combining based on a control signal received from each of the plurality of antennas.

Example 19 is the method of example 18 that may optionally include that the control signal comprises a signal indicating whether the antenna has a physical layer lock with the satellite.

Example 20 is the method of example 19 that may optionally include that, responsive to receiving the control signal indicating one antenna of the plurality antennas does not have physical layer lock with the satellite, excluding the signal from the one antenna from combining with one or more signals received from the other antennas, and subsequently upon receiving the control signal indicating one antenna of the plurality antennas has physical layer lock with the satellite, then the combiner dynamically selecting the signal from the one antenna for combining with one or more signals received from the other antennas.

Example 21 is the method of example 17 that may optionally include obtaining, by the combiner, signal metrics from the antennas on predetermined regular intervals related to antenna frame rate of the plurality of antennas.

Example 22 is the method of example 17 that may optionally include that combining the signals comprises coherently summing the signals using Maximal Ratio combining, equal gain combining, switched combining, or selection combining.

Example 23 is a system comprising two or more of the apparatus defined in example 1; and a combiner coupled in a cascaded arrangement with at least one other combiner of the two or more apparatuses.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a plurality of antennas that each have a transmit aperture and a receive aperture and are operable to receive correlated signals from a satellite, wherein the receive aperture is operable to receive one of the signals from the satellite and determine its signal quality;
a combiner communicably coupled to the plurality of antennas to combine multiple signals received from the plurality of antennas into one signal, wherein the combiner is operable to determine which signals received by the plurality of antennas are to be combined into the one signal based, at least in part, on at least one signal quality metric regarding the signals, the at least one signal quality metric being received from one or more tracking receivers external to the combiner; and
a modem communicably coupled to receive the one signal from the combiner, wherein the modem is operable to send information to the plurality of antennas via the combiner as if only a single antenna is coupled to the combiner and the combiner is operable to aggregate information for the modem received from antennas in the plurality of antennas as if one single antenna provided the information to the combiner, thereby enabling the combiner to present the plurality of antennas as the single antenna and the modem to communicate via the combiner as if controlling one single antenna.

2. The apparatus defined in claim 1 wherein each of the one or more tracking receivers are part of a distinct one of the plurality of antennas.

3. The apparatus defined in claim 1 wherein the combiner is operable to select signals received from the plurality of antennas for combining based on a control signal received from each of the plurality of antennas.

4. The apparatus defined in claim 3 wherein the control signal comprises a signal indicating whether the antenna has a physical layer lock with the satellite.

5. The apparatus defined in claim 4 wherein, responsive to receiving the control signal indicating one antenna of the plurality antennas does not have physical layer lock with the satellite, the combiner does not combine the signal from the one antenna with one or more signals received from the other antennas, and subsequently upon receiving the control signal indicating one antenna of the plurality antennas has physical layer lock with the satellite, then the combiner dynamically selecting the signal from the one antenna for combining with one or more signals received from the other antennas.

6. The apparatus defined in claim 3 wherein the combiner is operable to select signals received from the plurality of antennas for combining based on a control signal for each signal indicative of whether the signal is to be combined.

7. The apparatus defined in claim 1 wherein the combiner is operable to obtain signal metrics from the antennas on predetermined regular intervals related to antenna frame rate of the plurality of antennas.

8. The apparatus defined in claim 1 wherein the combiner is operable to combine the signals by coherently summing the signals using Maximal Ratio combining, equal gain combining, switched combining, or selection combining.

9. The apparatus defined in claim 1 wherein the combiner is communicably coupled to the modem using a first pointto-point communication protocol and to each antenna in the plurality of antennas using a second point-to-point communication protocol.

10. The apparatus defined in claim 7 wherein at least one of the first and second point-to-point communication protocols comprises OpenAMIP®.

11. The apparatus defined in claim 1 wherein the combiner uses binary or text messages to communicate with the antennas on a continuous basis to obtain one or more antenna metrics from antennas in the plurality of antennas.

12. The apparatus defined in claim 1 wherein the combiner aggregates search count information from the plurality of antennas and sends the aggregated search count information to the modem.

13. The apparatus defined in claim 1 wherein the signal quality comprises Es/N0 information regarding the signal received by the antenna.

14. The apparatus defined in claim 1 wherein the modem provides a single modem connection to a network for the plurality of antennas.

15. The apparatus defined in claim 14 wherein the network is the Internet.

16. The apparatus defined in claim 1 wherein the combiner is coupled to the plurality of antennas and the modem via both RF cables and a network cable, and wherein the network cable comprises an Ethernet cable for an Ethernet communication path between the plurality of antennas, the combiner and the modem.

17. A method comprising:
sending signals received by a plurality of antennas that each have a transmit aperture and a receive aperture from a satellite;
determining, by each antenna of the plurality of antennas, signal quality for its respective received signal;
combining, by a combiner coupled to the plurality of antennas, multiple signals received from the plurality of antennas into one signal, including determining which signals received by the plurality of antennas are to be combined into the one signal based, at least in part, on at least one signal quality metric regarding the signals, the at least one signal quality metric received from one or more tracking receivers external to the combiner; and
sending the one signal from the combiner to a modem, and further comprising
sending, by the modem, information to the combiner for the plurality of antennas as if the plurality of antennas are only a single antenna, and aggregating, by the combiner, information for the modem received from antennas in the plurality of antennas as if the single antenna provided the information to the combiner.

18. The method defined in claim 17 further comprising selecting, by the combiner, signals received from the plurality of antennas for combining based on a control signal received from each of the plurality of antennas.

19. The method defined in claim 18 wherein the control signal comprises a signal indicating whether the antenna has a physical layer lock with the satellite.

20. The method defined in claim 19 wherein, responsive to receiving the control signal indicating one antenna of the plurality antennas does not have physical layer lock with the satellite, excluding the signal from the one antenna from combining with one or more signals received from the other antennas, and subsequently upon receiving the control signal indicating one antenna of the plurality antennas has physical layer lock with the satellite, then the combiner dynamically selecting the signal from the one antenna for combining with one or more signals received from the other antennas.

21. The method defined in claim 17 further comprising obtaining, by the combiner, signal metrics from the antennas on predetermined regular intervals related to antenna frame rate of the plurality of antennas.

22. The method defined in claim 17 wherein combining the signals comprises coherently summing the signals using Maximal Ratio combining, equal gain combining, switched combining, or selection combining.

23. A system comprising:
two or more of the apparatus defined in claim 1; and
a combiner coupled in a cascaded arrangement with at least one other combiner of the two or more apparatuses.

* * * * *